(12) United States Patent
Hamaoka et al.

(10) Patent No.: US 6,483,296 B1
(45) Date of Patent: Nov. 19, 2002

(54) ANGULAR POSITION DETECTION APPARATUS

(75) Inventors: Takashi Hamaoka, Kariya (JP); Takamitsu Kubota, Kariya (JP); Kunio Nanba, Anjo (JP); Akira Shimazu, Toyota (JP); Kunio Tanaka, Nagoya (JP)

(73) Assignee: Denso Corporation, Kariya (JP)

( * ) Notice: Subject to any disclaimer, the term of this patent is extended or adjusted under 35 U.S.C. 154(b) by 217 days.

(21) Appl. No.: 09/589,772

(22) Filed: Jun. 9, 2000

(30) Foreign Application Priority Data

Jun. 17, 1999 (JP) .......................... 11-171650
Jun. 17, 1999 (JP) .......................... 11-171651
Aug. 31, 1999 (JP) .......................... 11-244306

(51) Int. Cl.$^7$ ................................ G01B 7/30
(52) U.S. Cl. ............... 324/207.25; 324/207.2; 324/207.21; 324/207.24
(58) Field of Search ............... 324/207, 207.2, 324/207.21–207.26, 208, 251, 252; 74/473.2; 361/139; 73/118.1; 123/399, 406.52; 251/129.04

(56) References Cited

U.S. PATENT DOCUMENTS

| | | | |
|---|---|---|---|
| 5,528,139 A | | 6/1996 | Oudet et al. |
| 5,544,000 A | * | 8/1996 | Suzuki ........................ 361/139 |
| 5,738,072 A | | 4/1998 | Bolte et al. |
| 5,789,917 A | | 8/1998 | Oudet et al. |
| 5,861,745 A | | 1/1999 | Herden |
| 6,194,894 B1 | * | 2/2002 | Apel ........................ 324/207.25 |
| 6,201,388 B1 | * | 3/2002 | Pecheny ..................... 324/207.2 |

FOREIGN PATENT DOCUMENTS

| | | |
|---|---|---|
| DE | 196 34 281 A1 | 2/1998 |
| DE | 196 34 282 A1 | 2/1998 |
| EP | 0575971 A1 | 12/1993 |
| GB | 2267154 A | 11/1993 |

* cited by examiner

Primary Examiner—Michael Sherry
Assistant Examiner—Trung Nguyen
(74) Attorney, Agent, or Firm—Nixon & Vanderhye P.C.

(57) ABSTRACT

An angular position detection apparatus, which can improve a detection accuracy of the angular position by improving a linearity of an output characteristic with respect to an angular position detection apparatus, and to downsize an outer size thereof. A permanent magnet is fixed to a side surface of a rotor core, which integrally rotates with a detection target object. An inner surface of a cylindrical portion of the rotor core is closely confronted with an outer surface of a stator core. Thus, the angular position detection apparatus is formed as a radial gap type in which magnetic flux is gone through an air gap G1 between the cylindrical portion and the stator core along a radial direction. A magnetic flux detection gap portion is formed at a center portion of the stator core so as to go through toward a diametral direction. A Hall IC is arranged in the magnetic flux detection gap portion. The permanent magnet is magnetized so that lines of magnetic force therein are parallel with each other. As a result, it can expand the range, in which the magnetic flux density in the magnetic flux detection gap portion linearly changes in proportion to the angular position of the rotor core, and it can improve the linearity of output characteristic of the Hall IC with respect to the angular position.

23 Claims, 22 Drawing Sheets

FIG. I
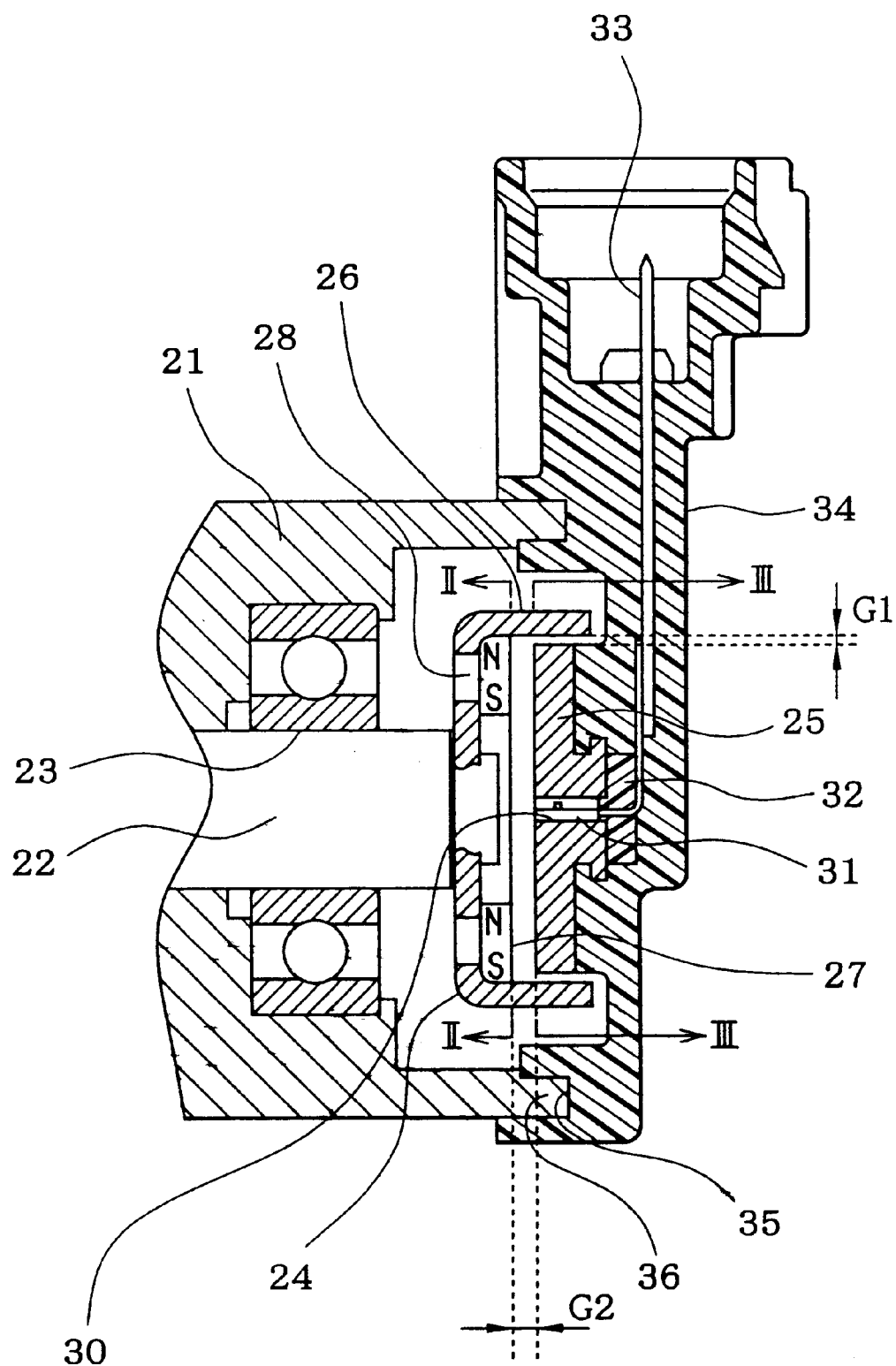

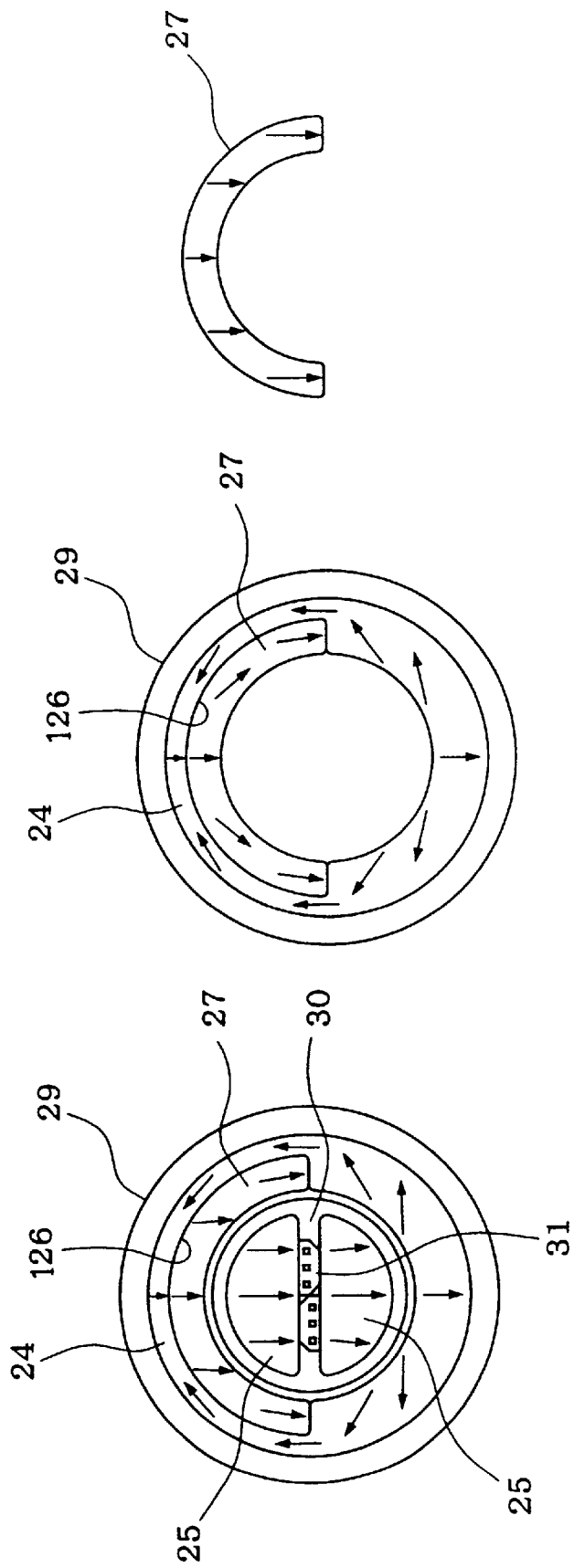

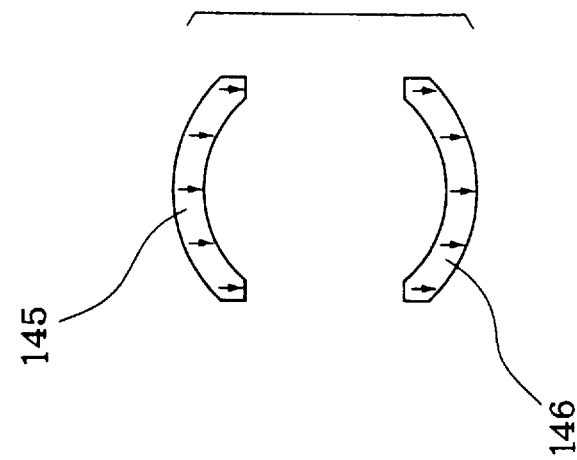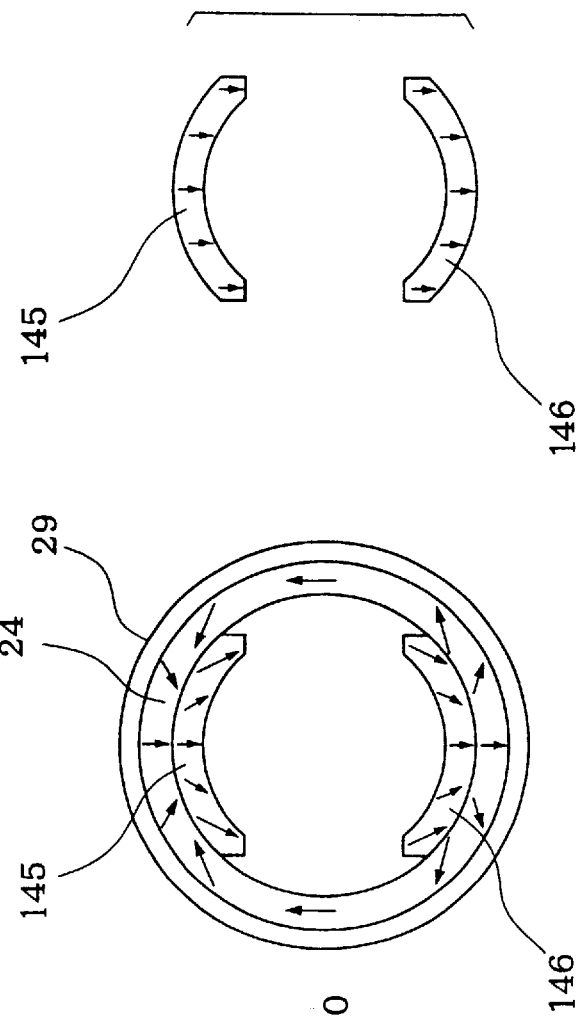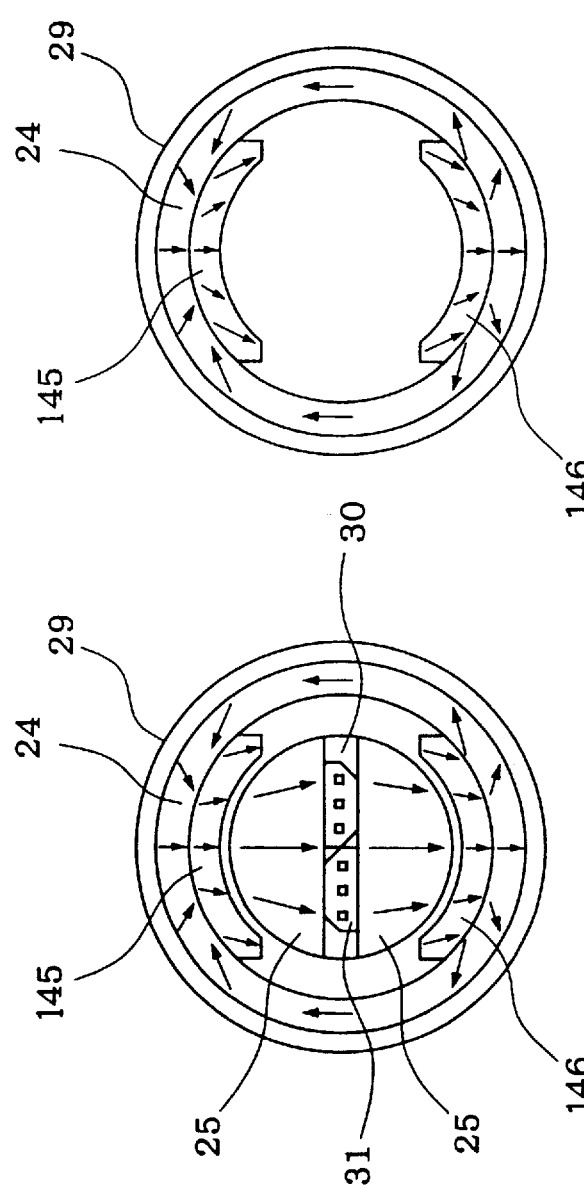

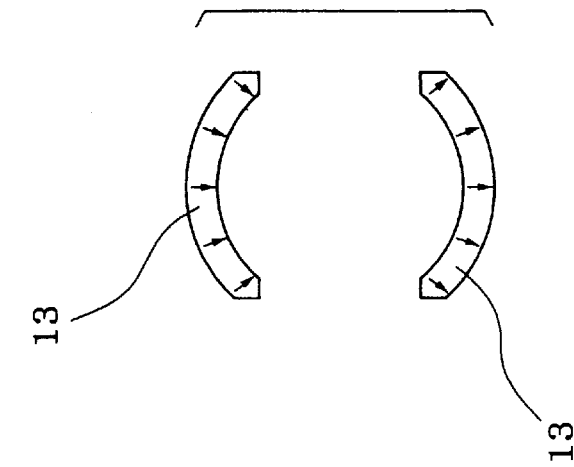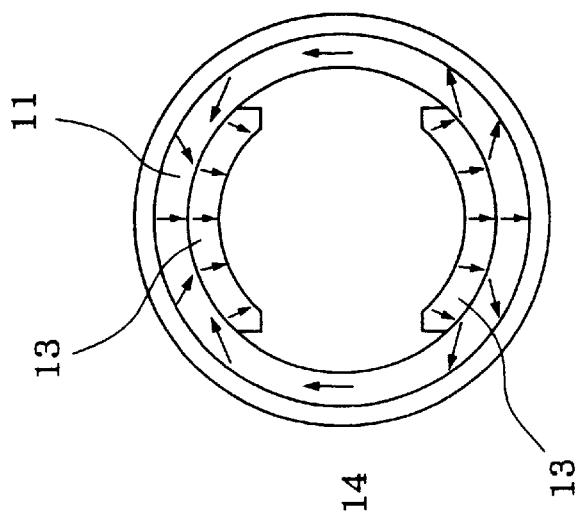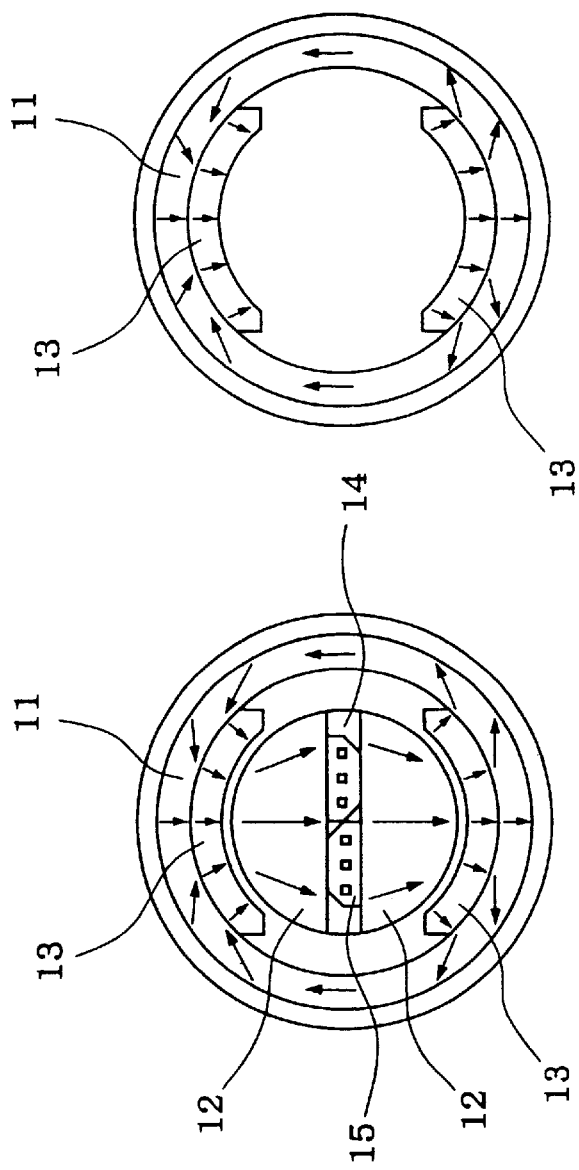

ANGULAR POSITION DETECTION APPARATUS

CROSS REFERENCE TO RELATED APPLICATION

This application is based upon Japanese Patent Application Nos. Hei. 11-171650 filed on Jun. 17, 1999, Hei. 11-171651 filed on Jun. 17, 1999, and Hei. 11-244306 filed on Aug. 31, 1999, the contents of which are incorporated herein by reference.

BACKGROUND OF THE INVENTION

1. Field of the Invention

The present invention relates to angular position detection apparatuses, and in particular to an angular position detection apparatuses containing a permanent magnet which is magnetized so that lines of magnetic force are parallel with each other.

2. Related Art

In an angular position detection apparatus, which detects for example an opening degree of a throttle valve (an opening degree of a throttle) of an internal combustion engine, as shown in FIG. 22, a stator core 12 is concentrically arranged at an inner side of a cylindrical rotor core 11, which integrally rotates with throttle valve (not-shown). Two permanent magnets 13 having circular arc are fixed to the inner side of the rotor core 11 so as to confront each other with sandwiching the stator core 12. Each of the permanent magnets 13 is radially magnetized so that all of lines of magnetic force in the permanent magnets 13 are set to a radial direction. Here, in FIG. 22, directions of lines of magnetic forces in each of parts are illustrated by arrows (→). Incidentally, a magnetic flux detection gap portion 14 having a constant width is formed at a center portion of the stator core 12 so as to open along a diametral direction. A magnetic detection element 15 such as a Hall IC is provided in the magnetic flux detection gap portion 14.

According to this structure, as shown in FIG. 24, since a magnetic flux density going through the magnetic flux detection gap portion 14 of the stator 12 (magnetic flux density crossing the magnetic detection element 15) changes in proportion to the angular position of the rotor core 11, and since output of the magnetic detection element 15 changes in proportion to the magnetic flux density, the angular position of the rotor core 11 (angular position of the throttle valve) is detected based on the output of the magnetic detection element 15.

In the above-described structure, the output of the magnetic detection element 15 for detecting the angular position of the rotor core 11 changes in proportion to the magnetic flux density in the magnetic flux detection gap portion 14. Therefore, if the magnetic flux in the magnetic flux detection gap portion 14 linearly changes in proportion to the angular position of the rotor core 11, since an output characteristic of the magnetic detection element 15 regarding the angular position becomes linear, a detection characteristic of the angular position is improved.

However, according to the conventional structure discussed above, since the permanent magnets 13 are radially magnetized, it is impossible to secure a wide range in which magnetic flux in the magnetic flux detection gap portion 14 linearly changes in proportion to angular position of rotor core 11. Therefore, since linear output with respect to angular position can be obtained over only a relatively narrow range, detection accuracy of the angular position decreases. For example, as shown in FIG. 24, a range, in which the magnetic flux in the magnetic flux detection gap portion 14 linearly changes in proportion to the angular position of the rotor core 11, is at most approximately 80° (degrees). Therefore, when the angular position exceeds 80° (degrees), it is impossible to obtain linear output with respect to angular position, and detection accuracy of the angular position decreases.

Furthermore, since the permanent magnets 13 are arranged so as to confront with an outer surface of the stator core 12, an outer size of the rotor core 11 for fixing the permanent magnets 13 and therefore an outer size of the angular position detection apparatus becomes bulky.

Moreover, in order to uniformly radially magnetize the permanent magnets 13, a density of the inner side of the permanent magnet 13 needs to be dense and a density of the outer side thereof needs to be coarse. Therefore, strength of the permanent magnet 13 is likely to decrease due to a difference in density.

SUMMARY OF THE INVENTION

This invention has been conceived in view of the background thus far described and its first object is to provide an angular position detection apparatus in which a linearity of an output characteristic with respect to an angular position can be improved so as to improve a detection accuracy of the angular position.

Its second object is to improve strength of a permanent magnet.

Its third object is to downsize an outer size of the angular position detection apparatus.

According to one aspect of the present invention, a permanent magnet is fixed to a side portion of a rotor core, so that the permanent magnet does not confront with an outer surface of a stator core. Thus, an outer size of the rotor core and therefore an outer size of the angular position detection apparatus can be downsized.

In this case, it can be thought of as an axial gap in which a gap toward an axial direction (shaft direction) between the permanent magnet and the stator core exists, so that magnetic flux goes through the gap along the axial direction. However, one needs to form the air gap toward the axial direction between the permanent magnet and the stator core uniform and small, in order to improve linearity of the output characteristic of a magnetic detection element. In this case, it needs to precisely control a ratio of flatness and a ratio of the parallelism of confronted surfaces of the permanent magnet (rotor core) and the stator core, and therefore it is hard to manufacture.

According to this structure, although the permanent magnet is fixed to the side portion of the rotor core, the angular position detection apparatus is not formed as an axial gap type, but is formed as the radial gap type in which a cylindrical portion formed at the outer portion of the rotor core is closely confronted with the outer surface of the stator core, so that the magnetic flux goes through the air gap between the cylindrical portion and the stator core along the radial direction. As a result, when the axis between the rotor core and the stator core can be accurately controlled to be coaxial, the dimensional accuracy of the air gap can be also controlled. Furthermore, since the permanent magnet is fixed to the side portion of the rotor core, the permanent magnet can be formed in a flat plate shape, and therefore it can facilitate manufacture of the permanent magnet.

Moreover, in this structure, the permanent magnet is magnetized so that lines of the magnetic force in the permanent magnet are parallel with respect to each other (parallel magnetization). Thus, it can expand the range in which the magnetic flux density in the magnetic flux detection gap portion of the stator core linearly changes in proportion to rotation of the permanent magnet, compared to the radial magnetization in the related art. As a result, it can obtain linear output with respect to angular position over a wider range compared to the related art, and it can improve the detection accuracy of angular position. Furthermore, parallel magnetization can make the density of the permanent magnet uniform, so that the strength of the permanent magnet can be increased.

Incidentally, for example, in an electric throttle system, a throttle valve is rotated by an actuator such as a motor via a reduction mechanism, and angular position of the actuator is detected by an angular position apparatus to detect the angular position of the throttle valve (throttle opening degree). However, in this structure, since the throttle opening degree is calculated by dividing detected notation of the actuator by the reduction ratio of the reduction mechanism, detection error of the throttle opening becomes greater due to variation in the reduction ratio or backlash (backlash) between gears.

To solve the disadvantage, there is an electrical throttle system in which an angular position detection apparatus is externally provided on a extended line of a rotational shaft of the throttle valve, and a tip of the rotation shaft of the throttle valve is connected to a rotor in the angular position detection apparatus, so that the angular position of the throttle valve (throttle opening degree) is directly detected. However, according to this structure, since the angular position detection apparatus is provided at outer side of the cover, which covers the reduction mechanism, entire system may be bulky. Moreover, since the tip of the rotation shaft of the throttle valve is connected to the rotor in the angular position detection apparatus, a rotation resistance of a bearing, which supports the rotor in the angular position 5 detection apparatus, acts to the rotation shaft of the throttle valve. Thus, the rotation resistance of the throttle valve becomes large, and therefore the load of the actuator becomes large.

Therefore, according to another aspect of the present invention, a permanent magnet may be fixed to a rotation shaft of the rotating body such as a throttle valve, a magnetic detection element for detecting magnetic flux of the permanent magnet may be fixed at inner side of the cover, which covers a reduction mechanism. Thus, since the angular position of the rotating body is directly detected, the angular position of the rotating body can be accurately detected. In addition, since an angular position detection apparatus (permanent magnet and magnetic detection element) can be contained in an inside space of the cover, which covers the reduction mechanism), the entire system can be downsized compared to the related art. Since the rotor (permanent magnet) of the angular position detection apparatus is supported by the rotation shaft of the rotation body, it does not need to support the rotor (permanent magnet) of the angular position detection apparatus by a bearing. As a result, it can reduce a rotation resistance of the rotation shaft of the rotation body, which rotates the rotor of the angular position detection apparatus, and it can reduce a load of an actuator.

According to still another aspect of the present invention, a permanent magnet to be fixed to a rotor core is magnetized so that lines of magnetic force in the permanent magnetic are set to parallel (parallel magnetization). When the permanent magnet is magnetized in parallel, it can expand a range, in which the magnetic flux density in the magnetic flux detection gap portion of the stator core linearly changes in proportion to a rotation of the permanent magnet, compared to the radial magnetization as the related art. As a result, it can obtain the linear output with respect to the angular position in wider range compared to the related art, and it can improve the detection accuracy of the angular position. Furthermore, the parallel magnetization can make the density of the permanent magnet uniform, so that the strength of the permanent magnet can be increased.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIG. 1 is a vertical sectional view of an angular position detection apparatus illustrating a first embodiment of the present invention;

FIG. 12A is a diagram illustrating a parallel magnetization and flows of magnetic flux when all parts are assembled according to the fourth embodiment;

FIG. 12B is a diagram illustrating the parallel magnetization and the flows of magnetic flux when a stator is not provided according to the fourth embodiment;

FIG. 12C is a diagram illustrating the parallel magnetization and the flows of magnetic flux when it is not assembled according to the fourth embodiment;

FIG. 21A is a diagram illustrating a parallel magnetization and flows of magnetic flux when all parts are assembled according to the sixth embodiment;

FIG. 21B is a diagram illustrating the parallel magnetization and the flows of magnetic flux when a stator is not provided according to the sixth embodiment;

FIG. 21C is a diagram illustrating the parallel magnetization and the flows of magnetic flux when it is not assembled according to the sixth embodiment;

FIG. 22A is a diagram illustrating a radial magnetization and flows of magnetic flux when all parts are assembled according to the related art;

FIG. 22B is a diagram illustrating the radial magnetization and the flows of magnetic flux when a stator is not provided according to the related art;

FIG. 22C is a diagram illustrating the radial magnetization and the flows of magnetic flux when it is not assembled according to the related art;

DESCRIPTION OF THE PREFERRED EMBODIMENTS

First Embodiment

Figure 2A:
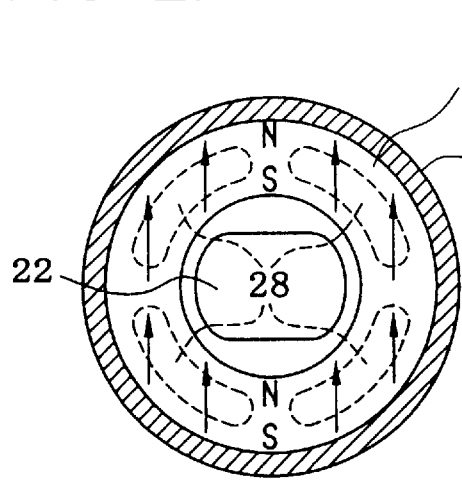
FIGS. 2A–2F are plan views taken along a line II—II in FIG. 1, illustrating each condition in which different shape permanent magnet is assembled.
Figure 2B:
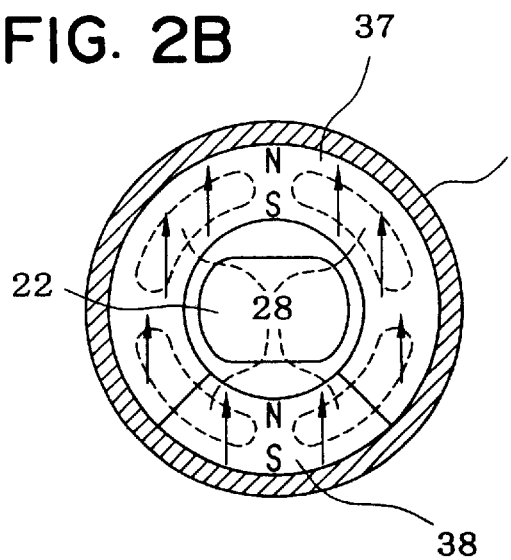
Figure 2C:
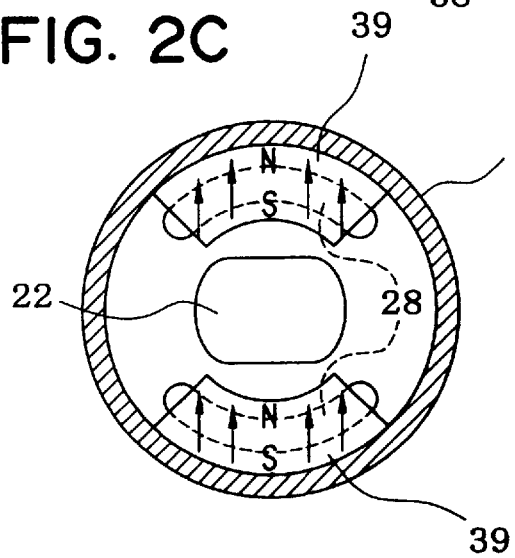
Figure 2D:
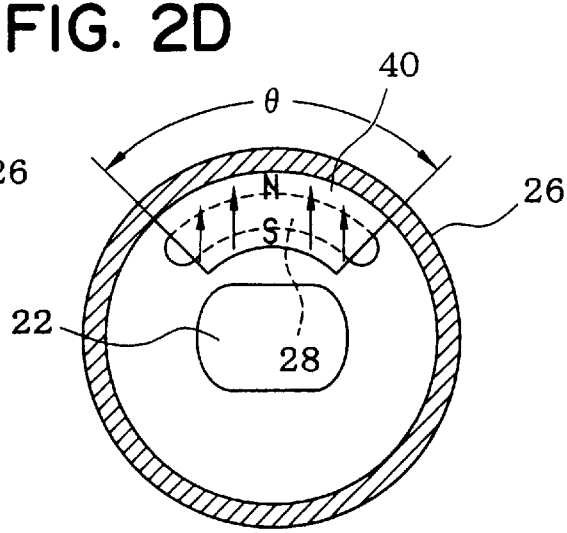
Figure 2E:
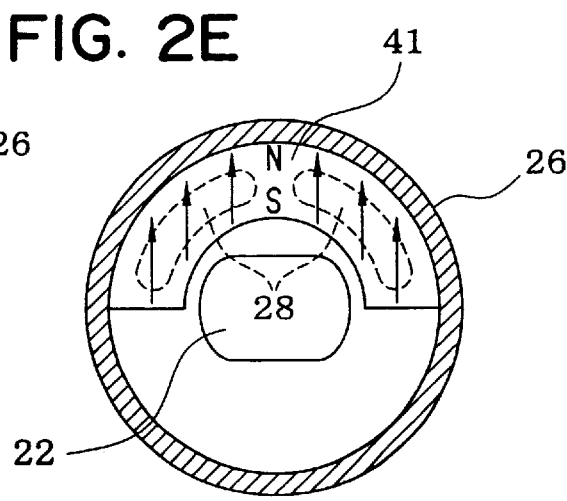
Figure 2F:
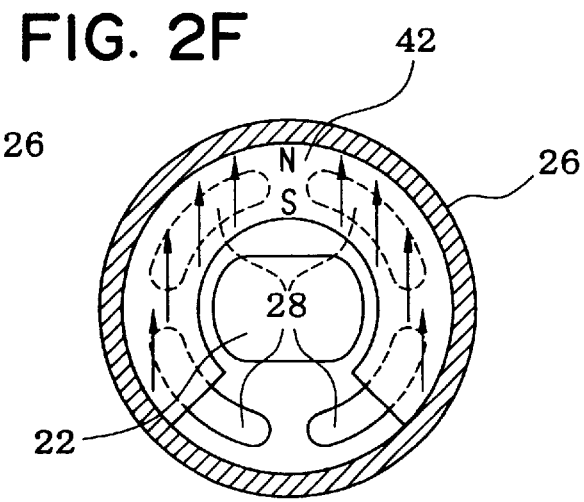

Hereinafter, a first embodiment of the present invention will be explained with reference to FIGS. 1 to 4.

At first, a whole structure of an angular position apparatus will be explained with reference to FIGS. 1 to 3. A rotation shaft 22 of a detection target object such as a throttle valve is inserted and rotatably supported to a main housing 21 of the angular position apparatus via a bearing 23. The rotation shaft 22 is made of a magnetic material such as iron. A rotor core 24 having a cylindrical cap shape is fixed to a tip (right side end) of the rotation shaft 22 by being swaged. A stator core 25 is concentrically arranged inner side of the rotor core 24. Each of the rotor core 24 and the stator core 25 is made of a magnetic material such as iron. An inner surface of a cylindrical portion 26, which formed at an outer side of the rotor core 24 toward a right direction, closely confronts with an outer surface of the stator core 25 with a predetermined gap G1 therebetween.

A permanent magnet 27 having a flat plate shape is fixed to a side surface portion of the rotor core 24, so that the permanent magnet 27 confronts with the stator core 25 toward an axial direction (shaft direction). An air gap dimension G2 between the permanent magnet 27 and the stator core 25 is set larger than an air gap G1 between the cylindrical portion 26 and the stator core 25. As a result, the angular position detection apparatus becomes a radial gap structure, in which it can prevent short-circuit of the magnetic flux between the permanent magnetic 27 and the stator core 25 and in which the magnetic flux is flowed in the radical direction of the air gap G1 between the inner surface of the cylindrical portion 26 and the outer surface of the stator core 25.

Incidentally, as shown in FIG. 2A, the permanent magnet 27 is formed in a ring shape and is concentrically fixed to the stator core by an adhesive or the like. The permanent magnet 27 is magnetized so that lines of magnetic force in the permanent magnet are parallel to each other at least under an unassembled condition. Even under an assembled condition (in which all parts are assembled), the lines of magnetic force in the permanent magnet are substantially parallel to each other.

Here, plural through holes 28 for preventing short-circuit of the magnetic flux are formed to the side surface of the rotor core 24 so as to surround the rotation shaft 22.

Incidentally, a magnetic flux detection gap portion 30, which has a constant width, for forming a parallel magnetic field is formed to a center portion of the stator core 25 so as to go through along a diametral direction (specifically, the stator core 25 is divided into two parts to form the magnetic flux detection gap portion 30 having the constant width, and a width of the magnetic flux detection gap portion 30 is restricted by a resin spacer 32). A pair of Hall IC 31 is arranged in the magnetic flux detection gap portion 30. Each Hall IC 31 is an IC, in which a Hall element (magnetic detection element) is integrally formed with an amplifying circuit, and outputs a voltage signal in accordance with a magnetic flux density going through the magnetic flux detection gap portion 30 (a magnetic flux density crossing the Hall IC 31). Each position of each Hall IC 31 is determined by the resin spacer 32. A terminal of the Hall IC 31 is connected to a connector pin 33 through inside of the spacer 32 by using welding or the like. A connector housing 34 is formed by resin-molding the connector pin 33, the stator core 25, the spacer 32, and so on.

A depression portion 35 having a ring shape is formed at a left side of the connector housing 34 concentrically with the stator core 25. The axes of the rotor core 24 and the stator core 25 are accurately aligned and secured by inserting a right end portion 36 of main housing 21 into the ring depression portion 35 with pressure and by fixing them by an adhesive or the like.

Figure 3A:
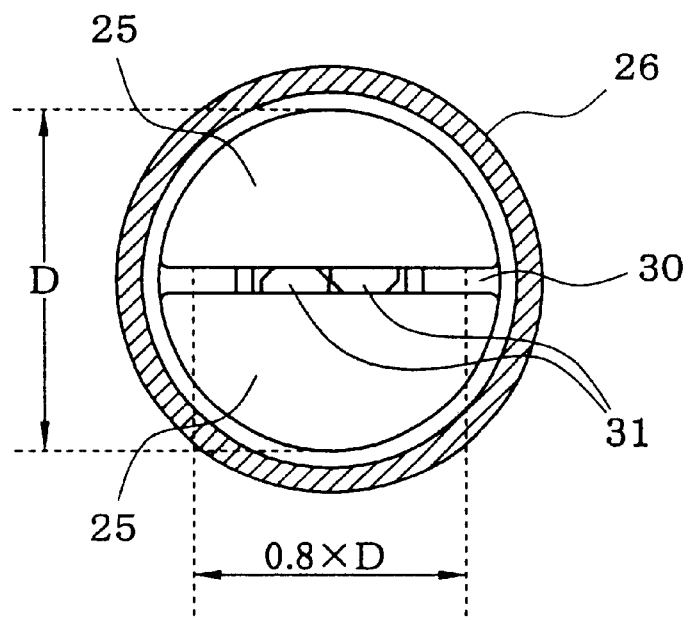
FIGS. 3A and 3B are plan views taken along a line III—III in FIG. 1, illustrating different arrangement of Hall IC, respectively.
Figure 3B:
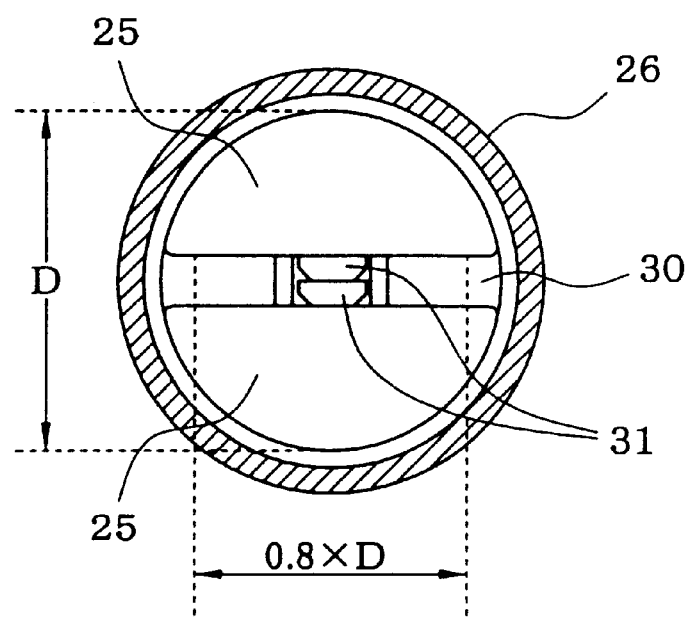

Next, an arrangement of the Hall IC 31 will be explained. As shown in FIG. 3A, the pair of Hall IC 31 is arranged along a direction perpendicular to a direction of the magnetic flux going through the magnetic flux detection gap portion 30 (vertical direction). As shown in FIG. 3B, the pair of the Hall IC 31 may be arranged by stacking toward a direction of the magnetic flux going through the magnetic flux detection gap portion 30. In each case, A Hall element built in the Hall IC 31 is arranged so that a position of the Hall element is within a range of 0.8×D, with respect to a diameter D of the stator core 25. As a result, it can substantially equalize the magnetic flux density crossing the Hall element of the pair of Hall IC 31.

Here, the Hall IC 31 may include a function for electrically trimming an output gain adjustment regarding the magnetic flux density, an offset adjustment, and a correction of a thermal characteristic, or may include a self diagnosis function for disconnection or short-circuit.

According to the angular position detection sensor described in the above, a magnetic circuit is formed in the following path: an upper portion of the permanent magnet 27→an upper portion of the cylindrical portion 26→an upper portion of the stator core 25→the magnetic flux detection gap portion 30→a lower portion of the stator core 25→a lower portion of the cylindrical portion 26→a lower portion of the permanent magnet 27→a center lower portion of the rotor core 24→rotation shaft 22→a center upper portion of the rotor core 24→the upper portion of the permanent magnet 27. When the rotor core 24 rotates in accordance with a rotation of the detection target object such as the throttle valve, the magnetic flux going through the magnetic flux detection gap portion 30 of the stator core 25 (the magnetic flux crossing the Hall IC 31) changes in proportion to the angular position thereof, and an output of the Hall IC 31 changes in proportion to the magnetic flux density. A control circuit (not-shown) detects the angular position of the rotor core 24 (angular position of the detection target object) after receiving the output of the Hall IC 31. In this time, the angular position is detected with ascertaining whether there is abnormality or not by comparing two outputs V1 and V2 from the pair of Hall IC 31 each other.

According to the first embodiment described in the above, since the permanent magnet 27 is magnetized in parallel, it can expand the range, in which the magnetic flux density in the magnetic flux detection gap portion 30 linearly changes in proportion to the angular position of the rotor core 24, compared to the radial magnetization as the related art. As a result, it can obtain the linear output with respect to the angular position in wider range compared to the related art, and it can improve the detection accuracy of the angular position. Furthermore, the parallel magnetization can make the density of the permanent magnet 27 uniform, so that the strength of the permanent magnet 27 can be increased.

Moreover, according to the first embodiment, since the permanent magnet 27 is fixed the side surface of the rotor 24, and since the permanent magnet 27 is formed so as not to confront with the outer surface of the stator core 25, an outer size of the rotor core 24 and be downsized and therefore an outer size of the angular position detection apparatus can be downsized.

Figure 4:
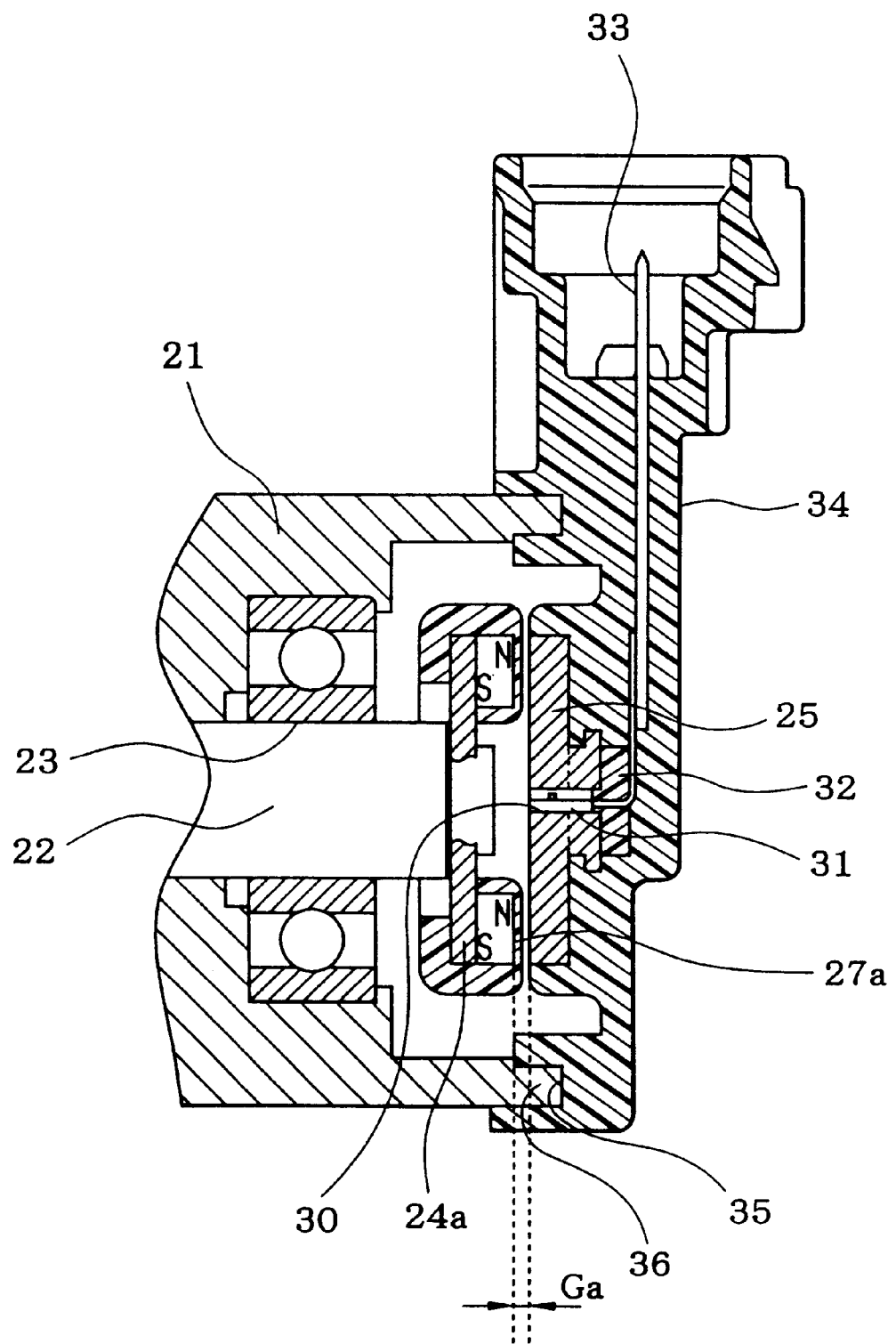
FIG. 4 is a vertical sectional view of an angular position detection apparatus of an axial gap type.

In this way, when the permanent magnet 27 is confronted with the stator core 25 toward the axial direction (shaft direction), it can be thought a structure having an axial gap type, in which a gap Ga toward the axial direction between a permanent magnet 27a and the stator core 25 as shown in FIG. 4, so that the magnetic flux can go through the gap Ga along the axial direction. However, in order to improve the linearity of the output characteristic of the Hall IC 31 with respect to the angular position in this structure, it needs to make the air gap Ga along the axial direction between the permanent magnet 27a and the stator core 25 uniform and needs to make the same small. In this case, it needs to precisely control a ratio of flatness and a ratio of parallel of confronted surfaces of the permanent magnet 27a (rotor core 24a) and the stator core 25, and therefore it easily causes a problem in manufacturing.

According to the first embodiment, the air gap dimension G2 between the permanent magnet 27 and the stator 25 is set so as not to short circuit therebetween, the cylindrical portion 26 of the rotor core 24 closely confronts with the outer surface of the stator core 25, and the angular position detection apparatus is formed in the radial gap type in which the magnetic flux go through the air gap G1 between the cylindrical portion 26 and the stator core 25 along the radial direction. Therefore, it can easily secure the accuracy of the sameness of the axis between the rotor core 24 and the stator core 25 and can secure the accuracy of the dimension of the air gap G1 with a simple method, in which the right end portion 36 of the main housing 21 is fixed to the ring depression portion 35 of the connector housing 34. As a result, it facilitates to make the air gap G1 uniformly and small, and it can easily improve the linearity of the output characteristic of the Hall IC 31 with respect to the angular position. Furthermore, since the permanent magnet 27 is fixed to the side surface of the rotor core 24, the permanent magnet 27 can be formed in the flat plate shape and can be easily manufactured, and it can reduce a cost of the permanent magnet 27.

Moreover, according to the first embodiment, since the permanent magnet 27 is formed in the ring shape and is concentrically fixed to the rotor core 24, it can expand the range, in which the magnetic flux density in the magnetic flux detection gap portion 30 linearly changes in proportion to the angular position of the rotor core 24, to the maximum. As a result, it can obtain the linear output with respect to the angular position in wider range. In addition, it can efficiently secure the magnetic flux density going through the magnet flux detection gap portion 30, even if a thickness of the permanent magnet 27 is thinned, when the permanent magnet 27 has the ring shape. Therefore, it can reduce an outer size in the axial direction of the angular position detection apparatus due to a thinning of the permanent magnet 27.

Here, in the first embodiment, the ring shape magnet is made up of one permanent magnet 27, however, the ring shape magnet may be made up of plural permanent magnets 37 and 38, each of which is magnetized in parallel.

The shape of the permanent magnet is not limited to the ring shape, and several modifications, as shown in FIGS. 2C–2F, can be thought. For example, according to the modification shown in FIG. 2C, two permanent magnets 39, each of which is magnetized in parallel and has a circular arc, is arranged at both sides of the side surface of the rotor core 24. According to the modifications shown in FIGS. 2D–2F, one permanent magnet 40–42, which is magnetized in parallel and has a circular arc, is arranged at one side of the side surface of the rotor core 24, and angle of circumference θ of each permanent magnet 40–42 can be widely changed. In this case, the range, in which the magnetic flux in the magnetic flux detection gap portion 30 linearly changes in proportion to the angular position of the rotor core 24, is likely to be expanded, as the angle of circumference θ of the permanent magnet becomes big. Therefore, the angle of circumference θ of the permanent magnet may be determined in view of the liner output range to be required.

Here, the through hole 28, which is formed to the side surface of the rotor core 24 for preventing the short-circuit of the magnetic flux, can be formed at a position corresponding to the permanent magnet, as shown FIGS. 2A–2F.

Second Embodiment

Figure 5:
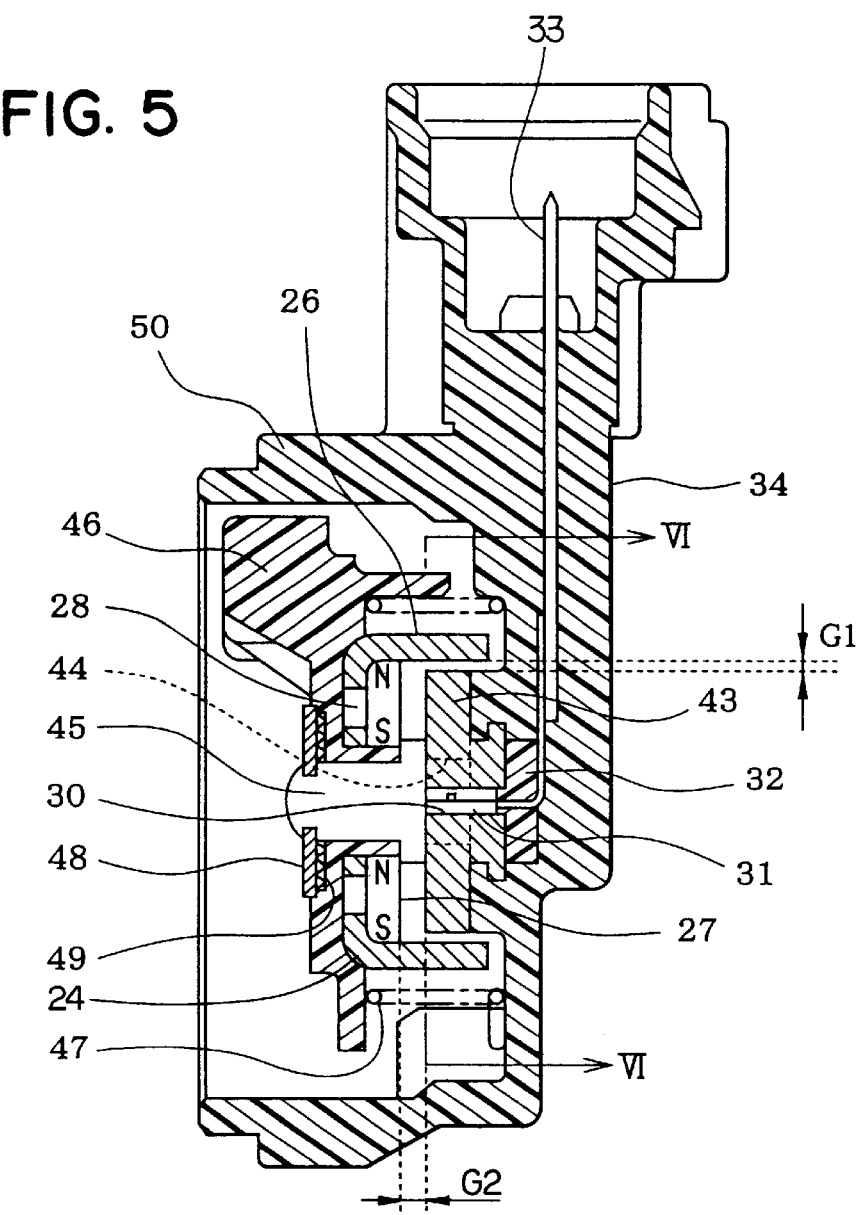
FIG. 5 is a vertical sectional view of an angular position detection apparatus illustrating a second embodiment of the present invention.

Next, a second embodiment of the present invention will be explained with reference to FIGS. 5 and 6. Here, portions, which are substantially the same portion as those of the first embodiment, are put the same symbols to omit explanations.

In the second embodiment, the connector housing 34 is molded with resin under a condition where a right end portion of a shaft 45 made of non-magnetic material is inserted into a shaft hole 44, which is formed at the center portion of a stator core 43. Thus, the shaft 45 is perpendicularly fixed at a left side surface of the stator core 43. Furthermore, a rotation lever 46 for connecting with the detection target is formed by molding the rotor core 24 and the permanent magnet 27 using resin. A molded resin portion, which is an inner side of the rotor core 24 and the permanent magnet 27, of the rotation lever 46 is inserted and rotatably supported to an outer side of the shaft 45. Here, the molded resin portion, which is an inner side of the rotor core 24 and the permanent magnet 27, acts as a bearing (slidably movable portion) with respect to the shaft 45. The rotation lever 46 is pressed to a predetermined rotational direction by a twist coil spring 47, and is automatically returned to an initial position by a spring force.

A stopper plate 48, which is fixed to a tip portion of the shaft 45, prevents the rotation lever 46 from being removed. A ring washer 49 for restricting a movement of the rotation lever toward a thrust direction is sandwiched between the stopper plate 48 and the rotation lever 46.

According to the second embodiment, the permanent magnet 27 is magnetized in parallel, and air gap dimension G2 between the permanent magnet 27 and the stator core 43 is set larger than an air gap G1 between the cylindrical portion 26 and the stator core 43. As a result, the angular position detection apparatus becomes a radial gap structure, in which it can prevent short-circuit of the magnetic flux between the permanent magnetic 27 and the stator core 43 and in which the magnetic flux is flowed in the radical direction of the air gap G1 between the inner surface of the cylindrical portion 26 and the outer surface of the stator core 43. Here, the shape and arrangement of the permanent magnet 27 may be selected one of FIGS. 2A–2F.

Figure 6:
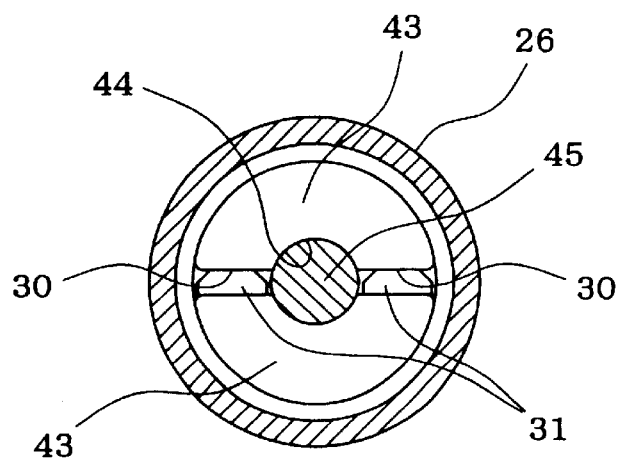
FIG. 6 is a sectional view taken along a line VI—VI in FIG. 5.

Moreover, as shown in FIG. 6, the magnetic flux detection gap portion 30 is formed in the stator core 43 so as to go through the same. The pair of Hall IC 31 is arranged at the magnetic flux detection gap portion 30 so as to confront with each other with respect to the shaft 45. A cylindrical cover 50 is integrally formed with the connector housing 34 to surround the rotation lever 46 or the rotor core 24.

According to the second embodiment described in the above, similar to the first embodiment, since the permanent magnet 27 is magnetized in parallel, it can improve the linearity of the output characteristic with respect to the angular position of the rotor core 24, and can improve the detection accuracy of the angular position. Furthermore, the angular position detection apparatus is formed in the radial gap type, in which the magnetic flux is gone through the air gap G1 between the cylindrical portion 26 of the rotor core 24 and the stator core 43 toward the radial direction, with fixing the permanent magnet 27 to the side surface of the rotor core 24. Therefore, the dimension accuracy of the air gap GI can be easily controlled with downsizing the outer size of the angular position detection apparatus.

In the first and the second embodiments described in the above, the permanent magnet 27 is fixed to the right side surface of the side surface of the rotor core 24; however, it may be fixed to a left side thereof.

Third Embodiment

Figure 7:
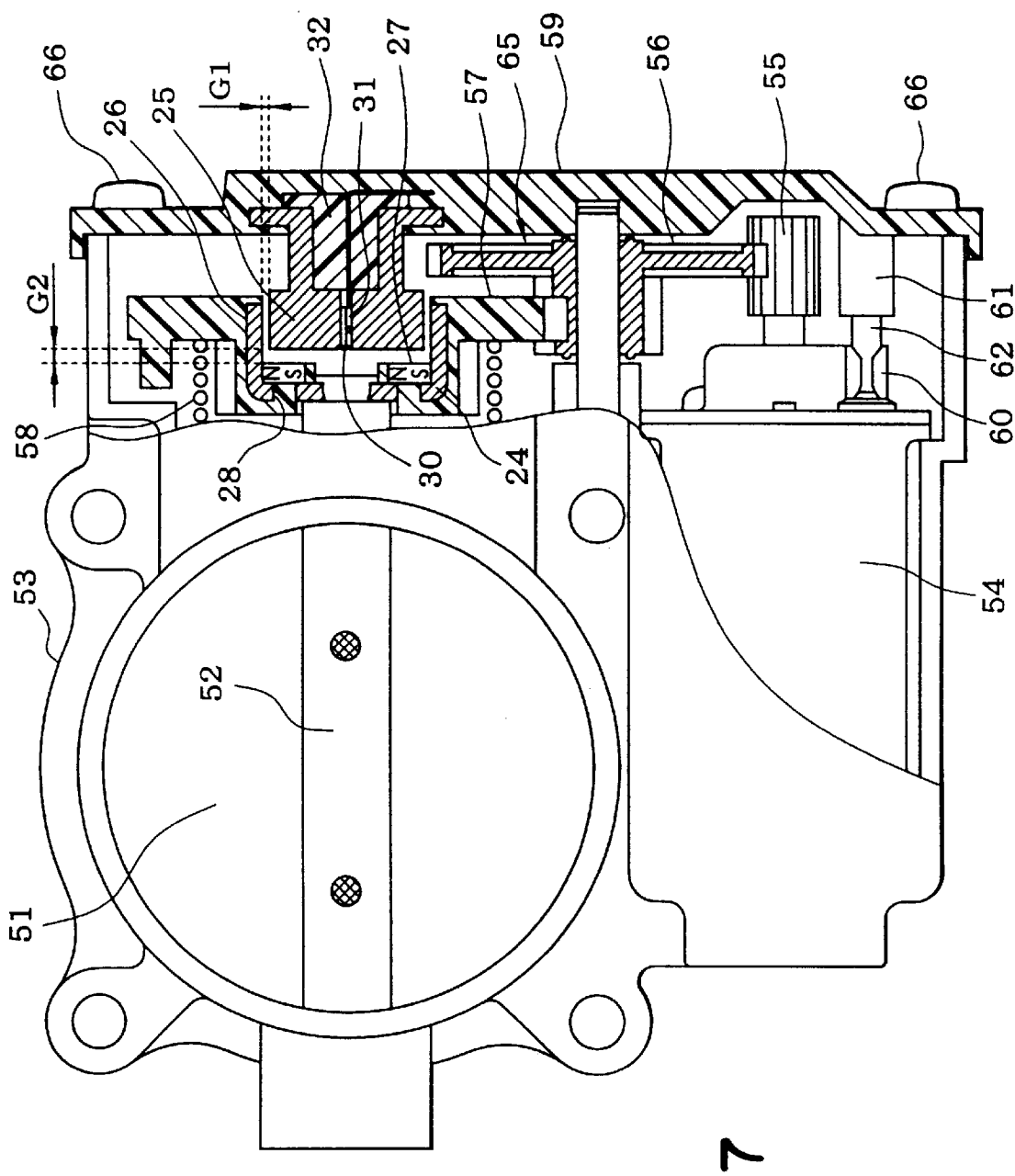
FIG. 7 is a partial vertical sectional view of an electric throttle system illustrating a third embodiment of the present invention.

Next, a third embodiment in which the present invention is applied to an electric throttle system will be explained with reference to FIG. 7. Here, portions, which are substantially the same portion as those of the first embodiment, are put the same symbols to omit explanations.

At first a schematic structure of the electric throttle system will be explained. A throttle valve 51 (rotation body) for controlling an amount of intake air of an internal combustion engine is fixed to a rotation shaft 52. The rotation shaft 52 is rotatably supported to a throttle body 53 via a bearing (not-shown). A motor 54 (actuator) for actuating the throttle valve 51 is assembled at a lower portion of the throttle body 53. Revolutions of the motor 54 are reduced by a reduction mechanism 65, which is made up of plural gears 55–57, and are transmitted to the rotation shaft 52. As a result, the throttle valve 51 is actuated so as to rotate.

The gear 57 fixed to the rotation shaft 52 of the throttle valve 51 is manufactured by an insert-forming of the rotor core 24 and the permanent magnet 27. The gear 57, rotor core 24 and the permanent magnet 27 are integrated, and the integrated structure is fixed to a tip portion of the rotation shaft 52 by using a swaging. The gear 57 is pressed to a predetermined rotational direction by a twist coil spring 58, so that the throttle valve is automatically returned to an initial position by a spring force.

Incidentally, the stator core 25, in which the Hall IC 31 is arranged, and the spacer 32 are insert-formed at the inner side of a resin cover 59, which covers the reduction mechanism 65. The cover 59 is fixed to the right end opening of the throttle body 53 by using bolts 66 or the like, so that the stator core 25 and the Hall IC 31 are fixed inner side of the cover 59. Thus, the angular position detection sensor, which is made of the rotor core 24, the permanent magnet 27, the Hall IC 31 and so on, is contained in a space in the cover 59. The structure of the angular position detection apparatus is substantially the same as that of the first embodiment.

Here, a connector housing 61 for being connected to a motor terminal 60 is integrally formed in the cover 59. A connector pin 62 in the connector housing 61 is connected to the motor terminal 60.

According to the third embodiment described in the above, similar to the first embodiment, since the permanent magnet 27 is magnetized in parallel, it can improve the linearity of the output characteristic with respect to the angular position of the rotor core 24. Furthermore, air gap dimension G2 between the permanent magnet 27 and the stator core is set larger than an air gap G1 between the cylindrical portion 26 and the stator core 25. The angular position detection apparatus is formed in the radial gap type, in which the magnetic flux is gone through along the radial direction, with fixing the permanent magnet 27 to the side surface of the rotor core 24. Therefore, the dimension accuracy of the air gap G1 can be easily controlled with downsizing the outer size of the angular position detection apparatus.

According to the third embodiment described in the above, the permanent magnet 27 is fixed to the rotation shaft 52 of the throttle valve 51, so that the magnetic flux of the permanent magnet 27, which changes in proportion to the rotation of the throttle valve 51, is detected by the Hall IC 31 fixed in the cover 59. Therefore, angular position (throttle opening degree) of the throttle valve 51 can be directly detected, and can improve the detection accuracy of the throttle opening degree.

Moreover, the angular position detection apparatus, which is provided with the rotor core 24, the permanent magnet 27, the stator core 25, the Hall IC 31 and so on, is contained in the space in the cover 59 of the reduced mechanism. Therefore, it can downsize the entire system compared to the conventional type in the angular position detection apparatus. Since the rotor core 24 and the permanent magnet 27 of the angular position detection apparatus are supported by the rotation shaft 52 of the throttle valve 51, it does not need to support the rotor core 24 and the permanent magnet 27 by the bearing. Therefore, a rotation resistance of the rotation shaft 52 for rotating the rotor core 24 and the permanent magnet 27 can be reduced, and it can reduce a load of the motor 54.

According to the third embodiment, the gear 57 to be fixed to the rotation shaft 52 of the throttle valve 51 is made of resin. The gear 57, the rotor core 24 and the permanent magnet 27 are integrated by the insert-forming. Furthermore, the stator core 25 and the Hall IC 31 are integrated by the inserting the cover 59 of the reduction mechanism 65. Therefore, the number of the parts is reduced, it can improve an assembly, and it can reduce a cost.

Here, in the third embodiment, the permanent magnet 27 is fixed to the right side surface of the side surface of the rotor core 24; however, it may be fixed to a left side thereof. The permanent magnet 27 is magnetized in parallel; however, the permanent magnet 27 may be magnetized so that the line of the magnetic force in the permanent magnet 27 is set to the radial direction (radial-magnetization).

In the third embodiment, the angular position detection apparatus is formed as the radial gap type in which the magnetic flux is gone through along the radial direction by confronting the permanent magnet 27 along the axial direction with respect to the stator core 25; however, the angular position detection apparatus may be formed as an axial gap type in which the magnetic flux of the permanent magnet is gone through along the axial direction. Furthermore, the angular position detection apparatus maybe formed as a radial gap type in which the magnetic flux of the permanent magnet is gone through along the radial direction, by confronting the permanent magnet with the outer surface of the stator core 25.

Fourth Embodiment

At first, a whole structure of an angular position apparatus will be explained with reference to FIGS. 8 to 15.

Figure 8:
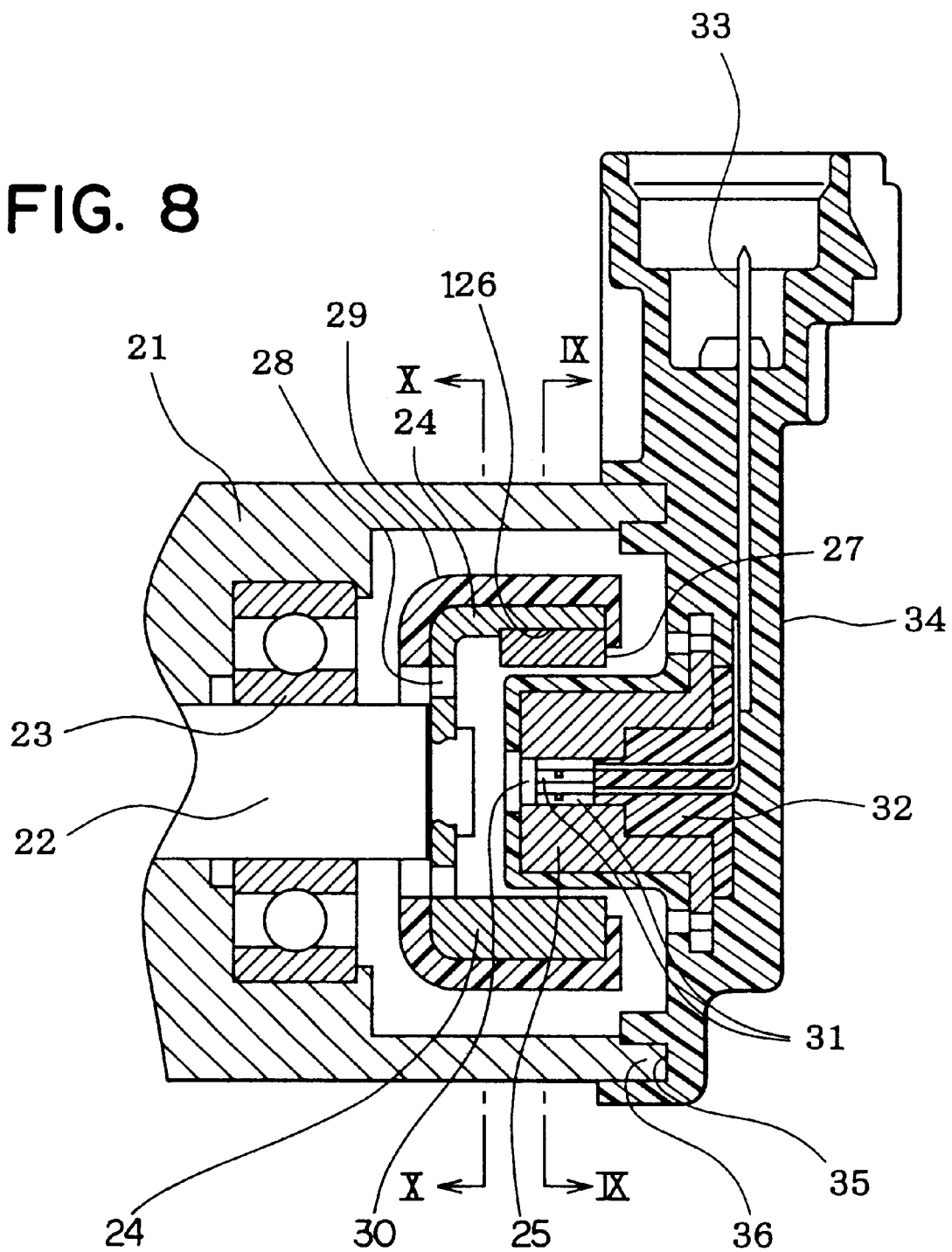
FIG. 8 is a vertical sectional view of an angular position detection apparatus illustrating a fourth embodiment of the present invention.

At first, a whole structure of an angular position apparatus will be explained with reference to FIGS. 8 to 10. A rotation shaft 22 of a detection target object such as a throttle valve is inserted and rotatably supported to a main housing 21 of the angular position apparatus via a bearing 23. A rotor core 24 having a cylindrical cap shape is fixed to a tip (right side end) of the rotation shaft 22 by being swaged. A stator core 25 is concentrically arranged inner side of the rotor core 24. Each of the rotor core 24 and the stator core 25 is made of a magnetic material such as iron.

Only one permanent magnet 27 having a semicircular shape is provided at inner portion of the rotor core 24. The rotor core 24 is inserted to a depression portion 126, which is formed along almost semicircle at the inner portion of the rotor core 24, and is fixed by using adhesive, resin mold or the like, so that air gap is uniformly generated along the whole circle of a periphery of the stator core 25. The permanent magnet 27 is magnetized so that lines of magnetic force in the permanent magnet are in parallel each other at least under unassembled condition, as shown in FIG 12C. In the case where the permanent magnet 27 is assembled to the rotor core 24, as shown in FIG. 12B, when there is no stator core 25 at the inner side of the rotor core 24, since the magnetic flux of the permanent magnet 27 passes the rotor core 24, the lines of the magnetic force in the permanent magnet 27 is inclined outwardly. Furthermore, in the case where the rotor core 24 is arranged at the inner portion of the rotor core, as shown in FIG. 12A, since the magnetic flux of the permanent magnet 27 goes through the stator core 25, the inclination of the lines of the magnetic force in the permanent magnet 27 is reduced, so that they become around parallel.

Figure 10:
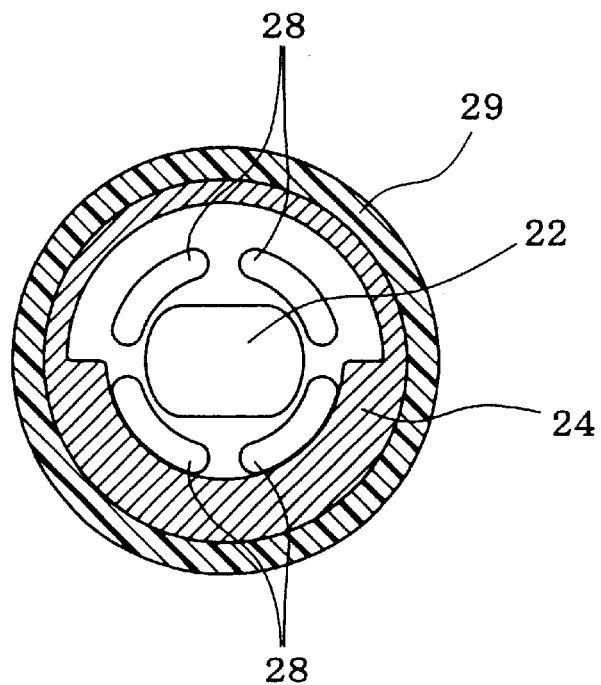
FIG. 10 is a sectional view taken along the line X—X in FIG. 8.

Here, plural through holes 28 for preventing short-circuit of the magnetic flux are formed to the side left side portion of the rotor core 24 so as to surround the rotation shaft 22 (see FIG. 10). An outer portion of the rotor core 24 is molded by resin 29.

Incidentally, a magnetic flux detection gap portion 30, which has a constant width, for forming a parallel magnetic field is formed to a center portion of the stator core 25 so as to go through along a diametral direction (specifically, the stator core 25 is divided into two parts to form the magnetic flux detection gap portion 30 having the constant width, and a width of the magnetic flux detection gap portion 30 is restricted by a resin spacer 32). A pair of Hall IC 31 is arranged in the magnetic flux detection gap portion 30. Each Hall IC 31 is an IC, in which a Hall element (magnetic detection element) is integrally formed with an amplifying circuit, and outputs a voltage signal in accordance with a magnetic flux density going through the magnetic flux detection gap portion 30 (a magnetic flux density crossing the Hall IC 31). Each position of each Hall IC 31 is determined by the resin spacer 32. A terminal of the Hall IC 31 is connected to a connector pin 33 through inside of the spacer 32 by using welding or the like. A connector housing 34 is formed by resin-molding the connector pin 33, the stator core 25, the spacer 32, and so on.

A depression portion 35 having a ring shape is formed at a left side of the connector housing 34 concentrically with the stator core 25. An accuracy of the sameness of the axis between the rotor core 24 and the stator core 25 are secured by inserting a right end portion 36 of the main housing 21 into the ring depression portion 35 with pressure and by fixing them by an adhesives or the like.

Figure 9A:
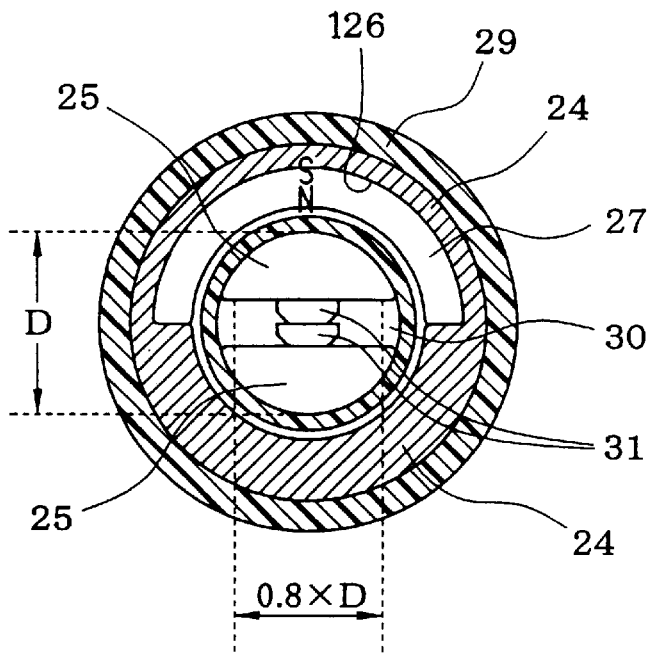
FIGS. 9A and 9B are plan views taken along a line IX—IX in FIG. 8, illustrating different arrangement of Hall IC, respectively.
Figure 9B:
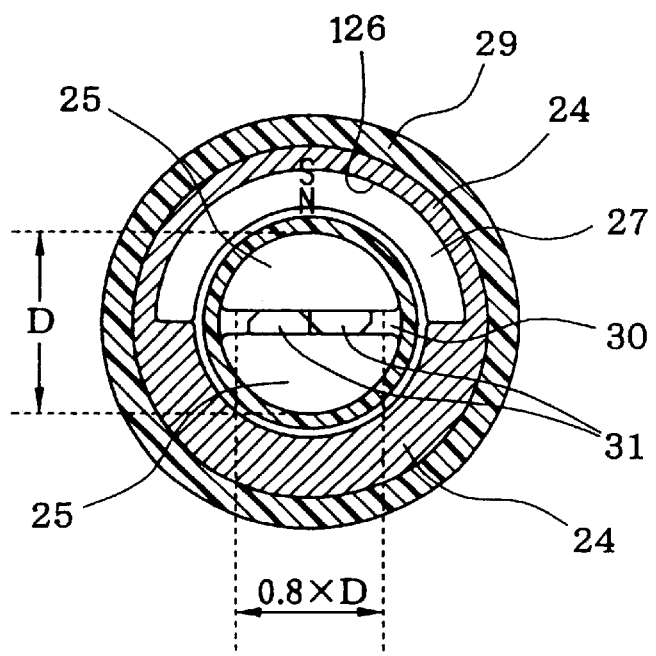

Next, an arrangement or connection method of the Hall IC 31 will be explained. As shown in FIG. 9A, the pair of Hall IC 31 is arranged by stacking toward a direction of the magnetic flux going through the magnetic flux detection gap portion 30. As shown in FIG. 9B, the pair of the Hall IC 31 may be arranged along a direction perpendicular to a direction of the magnetic flux going through the magnetic flux detection gap portion 30 (vertical direction). In each case, a Hall element built in the Hall IC 31 is arranged so that a position of the Hall element is within a range of 0.8×D, with respect to a diameter D of the stator core 25. As a result, it can substantially equalize the magnetic flux density crossing the Hall element of the pair of Hall IC 31.

Figure 11A:
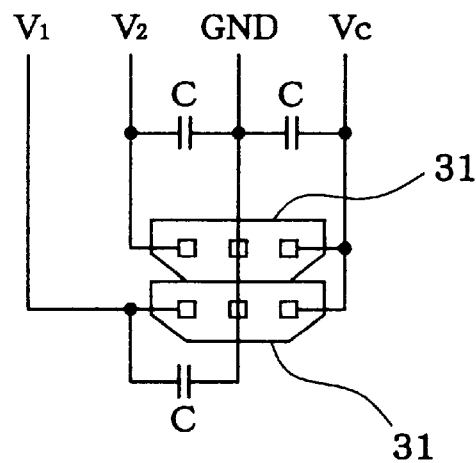
FIGS. 11A and 11B are circuit diagram illustrating different arrangement and different connection of the Hall IC, respectively.
Figure 11B:
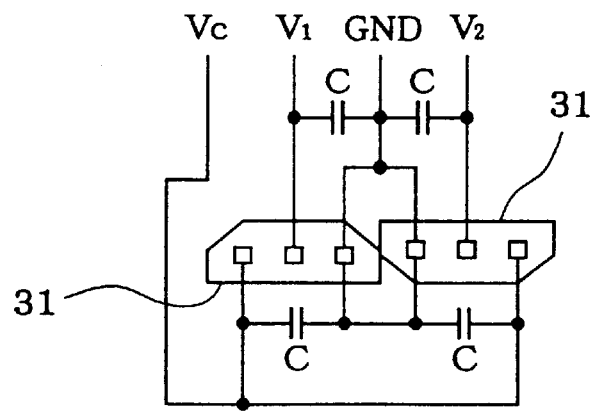

Here, as shown in FIG. 11A, in the case where two Hall IC 31 are stacked in the direction of the magnetic flux, it is preferable to arrange and stack the two Hall IC 31 in the same direction, so that output terminals V1 and V2 of the each Hall IC 31, a ground terminal GND and a power terminal Vc are not crossed. On the contrary, in the case where the two Hall IC 31 are arranged along a direction perpendicular to a direction of the magnetic flux, when each Hall IC 31 is arranged up-side-down each other as shown in FIG. 11B, the output terminals V1 and V2 of the each Hall IC 31, the ground terminal GND and the power terminal Vc mat not be not crossed.

Here, the Hall IC 31 may include a function for electrically trimming an output gain adjustment regarding the magnetic flux density, an offset adjustment, and a correction of a thermal characteristic, or may include a self diagnosis function for disconnection or short-circuit.

According to the angular position detection sensor described in the above, as shown in FIG. 12A, a magnetic circuit is formed in the following path: an N pole of the permanent magnet 27→an upper portion of the stator core 25→the magnetic flux detection gap portion 30→a lower portion of the stator core 25→the rotor core 24→an S pole of the permanent magnet 27. When the rotor core 24 rotates in accordance with a rotation of the detection target object such as the throttle valve, the magnetic flux going through the magnetic flux detection gap portion 30 of the stator core 25 (the magnetic flux crossing the Hall IC 31) changes in proportion to the angular position thereof, and an output of the Hall IC 31 changes in proportion to the magnetic flux density. A control circuit (not-shown) detects the angular position of the rotor core 24 (angular position of the detection target object) after receiving the output of the Hall IC 31. In this time, the angular position is detected with ascertaining whether there is abnormality or not by comparing two outputs V1 and V2 from the pair of Hall IC 31 each other.

Figure 13C:
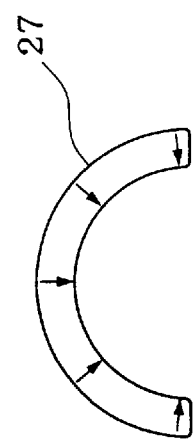
FIG. 13C is a diagram illustrating the radial magnetization and the flows of magnetic flux when it is not assembled according to the comparison.
Figure 13B:
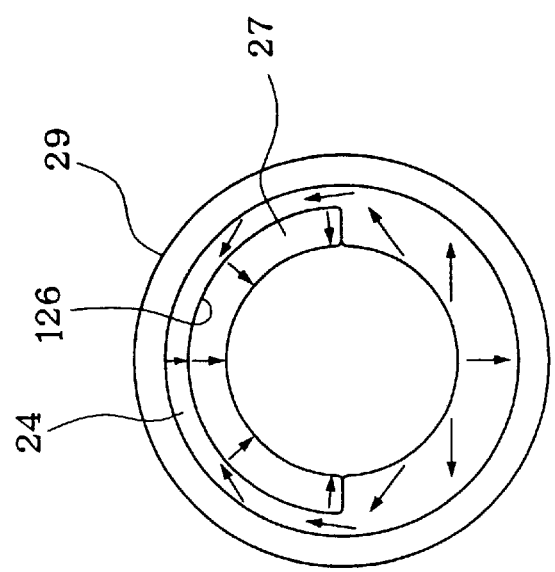
FIG. 13B is a diagram illustrating the radial magnetization and the flows of magnetic flux when a stator is not provided according to the comparison.
Figure 13A:
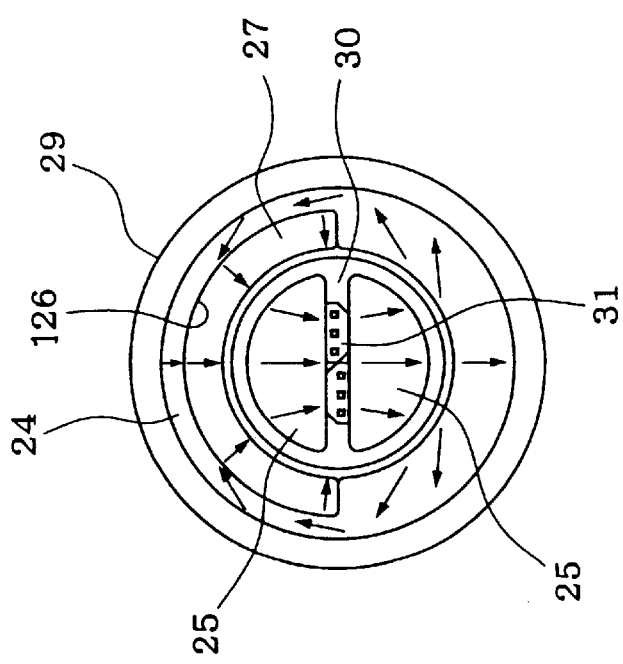
FIG. 13A is a diagram illustrating a radial magnetization and flows of magnetic flux when all parts are assembled according to a comparison.
Figure 15:
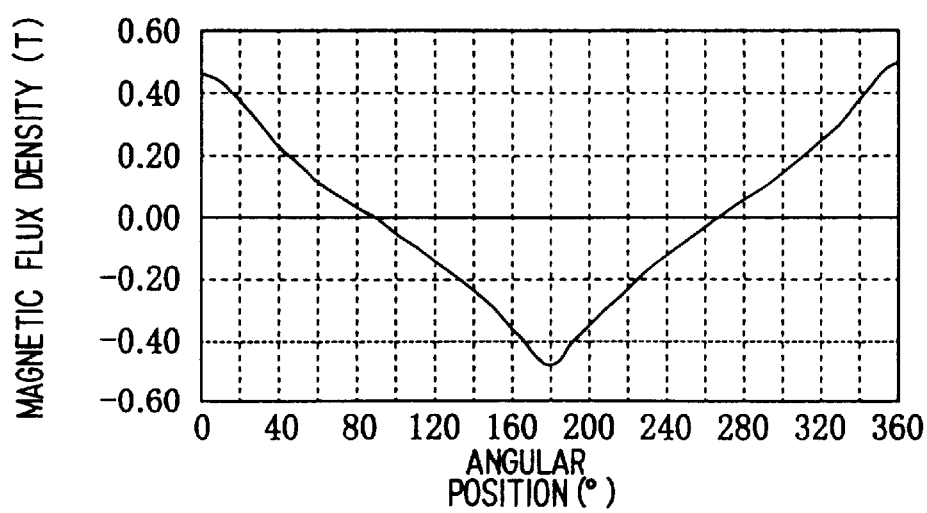
FIG. 15 is a graph illustrating a change characteristic of a magnetic flux density at a magnetic flux detection gap portion with respect to an angular portion of a rotor core of the comparison.

FIG. 13 shows a comparison in which the magnetization of the permanent magnet 27 is changed to a radial magnetization. According to this comparison, as shown in FIG. 15, the linearity of change in the magnetic flux of the magnetic flux detection portion 30 with respect to the angular position of the rotor core 24 decreases, and the linearity of the output characteristic of the Hall IC 31 decreases, and therefore the detection accuracy of the angular position decreases.

Figure 14:
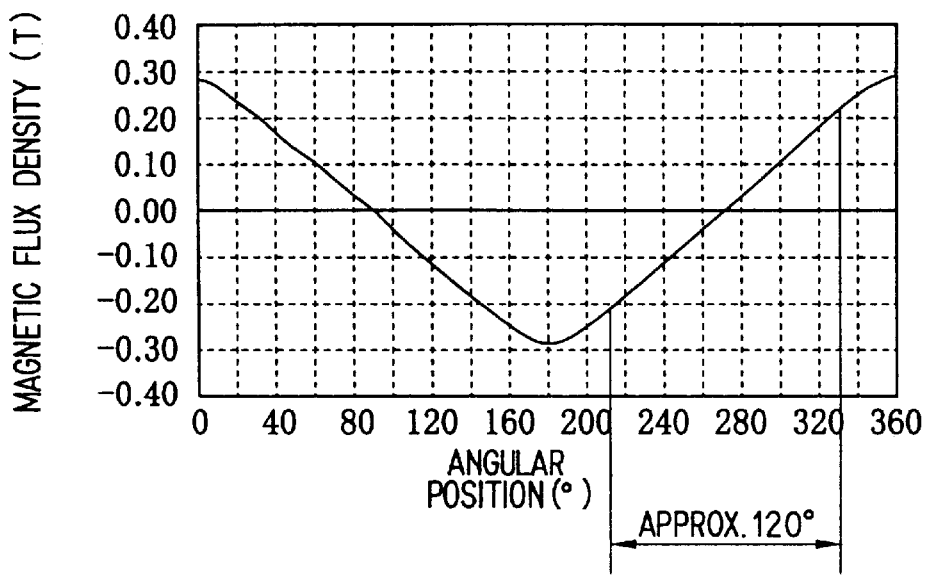
FIG. 14 is a graph illustrating a change characteristic of a magnetic flux density at a magnetic flux detection gap portion with respect to an angular portion of a rotor core of the fourth embodiment.

On the contrary, according to the fourth embodiment described in the above, since the permanent magnet 27 is magnetized in parallel, as shown in FIG. 14, it can improve the linearity of the change in the magnetic flux density at the magnetic flux detection gap portion 30 with respect to the angular position of the rotor core 24, and can expand the range, in which the magnetic flux density in the magnetic flux detection gap portion 30 linearly changes in proportion to the angular position of the rotor core 24, to or more than approximately 120° (degree). As a result, it can obtain the linear output with respect to the angular position in wider range compared to the related art, and it can improve the detection accuracy of the angular position. Furthermore, the parallel magnetization can make the density of the permanent magnet 27 uniform, so that the strength of the permanent magnet 27 can be increased.

According to the fourth embodiment, since the permanent magnet 27 is provided at the depression portion 126, which is formed at inner portion of the rotor core 24, the air gap surrounding the peripheral portion of the stator core 25 can be uniformed, and it can secure excellent linearity of the output characteristic with respect to the angular position of the rotor core 24, although only one permanent magnet 27 is provided at one side of the rotor core 24. Moreover, since the permanent magnet 27 is used only one, it can satisfy a demand that reduces of the number of the parts and a cost.

Furthermore, according to the fourth embodiment, the pair of Hall IC 31 is arranged to or perpendicular to the direction of the magnetic flux in the magnetic flux detection gap portion 30, and is arranged so that the position of the Hall IC 31 is within 0.8×D with respect to a diameter D of the stator core 25. Therefore, magnetic flux density crossing the Hall element of each Hall IC 31 can be substantially uniform; and the angular position can be detected with ascertaining whether there is no abnormality by comparing the outputs from the plural magnetic detection elements. Thus, reliability of the angular position detection apparatus can be improved.

Incidentally, it can be thought a structure having an axial gap type, in which the permanent magnet is confronted with the stator core toward the axial direction (shaft direction), so that the magnetic flux can go through the gap along the axial direction. However, in order to secure the excellent linearity of the output characteristic of the Hall IC with respect to the angular position in this structure, it needs to make the air gap along a thrust direction between the permanent magnet and the stator core uniform and needs to make the same small. In this case, it needs to precisely control a ratio of flatness and a ratio of parallel of confronted surfaces of the permanent magnet (rotor core) and the stator core, and therefore the cost may increase.

According to the fourth embodiment, the angular position detection apparatus is formed in the radial gap type in which the stator core 25 and the permanent magnet 27 are confronted with each other along the radial direction. Therefore, it can easily secure the accuracy of the sameness of the axis between the rotor core 24 (permanent magnet 27) and the stator core 25 and can secure the accuracy of the dimension of the air gap along the radial direction therebetween with a simple method, in which the right end portion 36 of the main housing 21 is fixed to the ring depression portion 35 of the connector housing 34. As a result, it facilitates to make the air gap G1 uniformly and small, and it can easily improve the linearity of the output characteristic of the Hall IC 31 with respect to the angular position.

Fifth Embodiment

Figure 16:
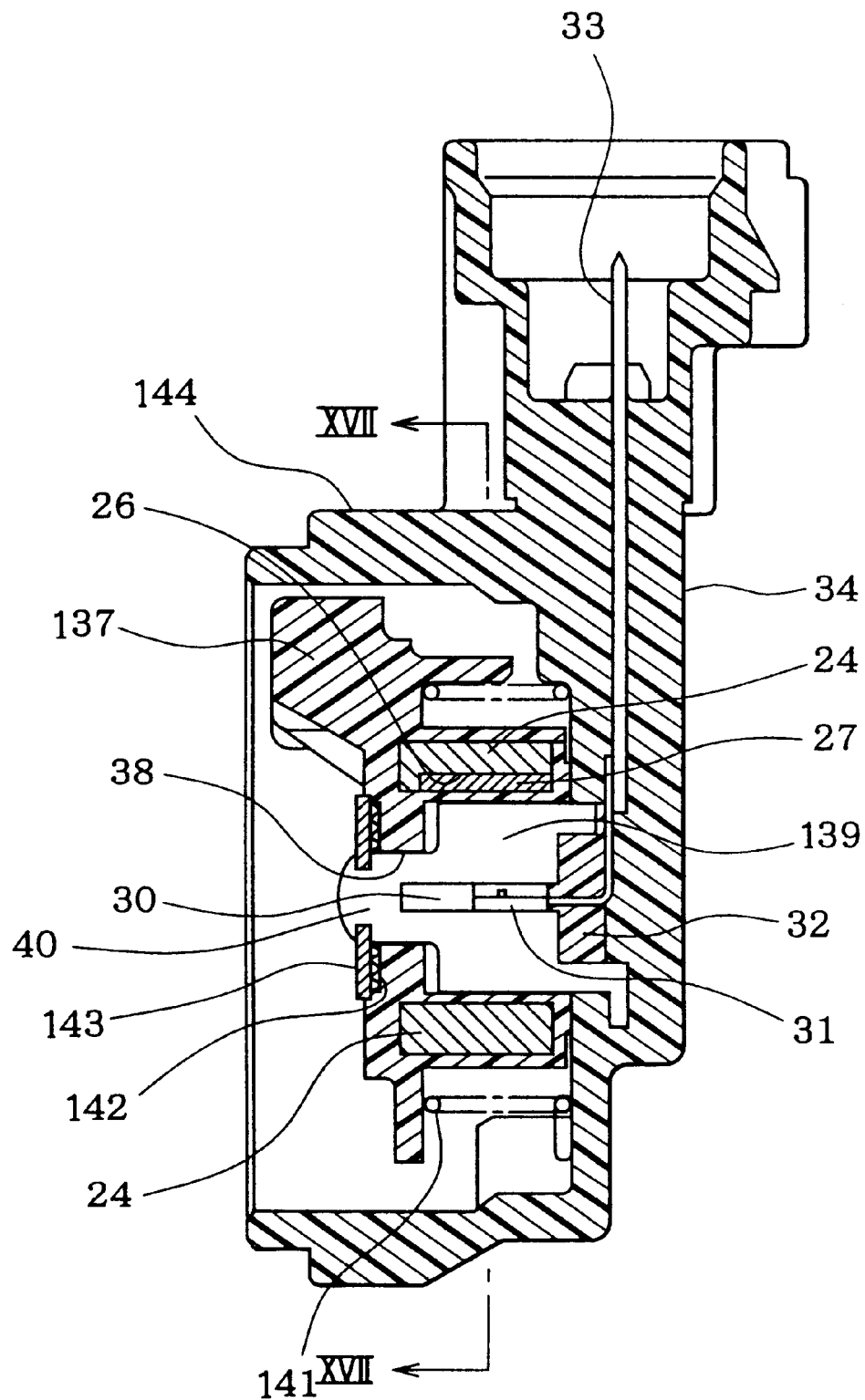
FIG. 16 is a vertical sectional view of an angular position detection apparatus illustrating a fifth embodiment of the present invention.
Figure 17A:
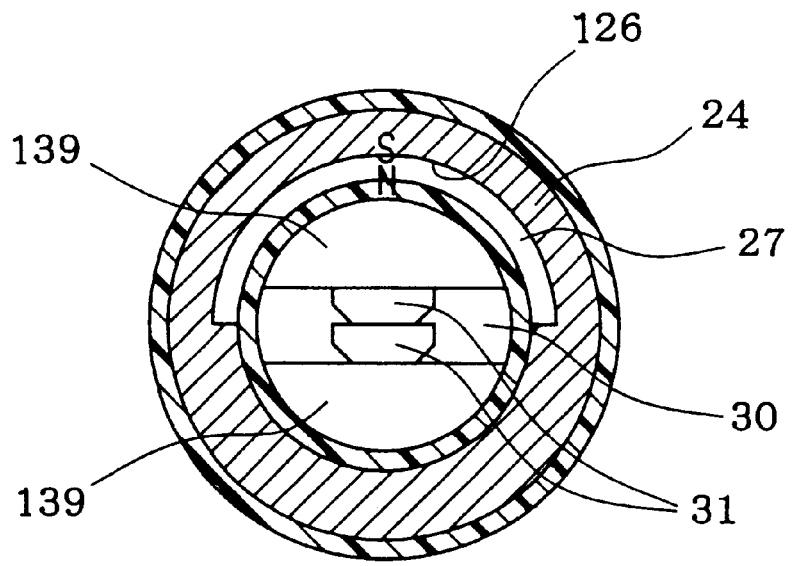
FIGS. 17A and 17B are plan views taken along a line XVII—XVII in FIG. 16, illustrating different arrangement of Hall IC, respectively.
Figure 17B:
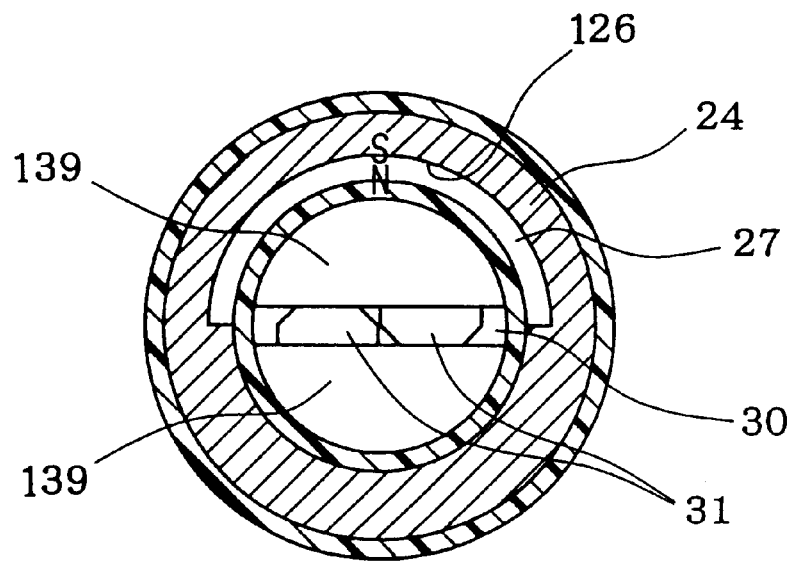
Figure 18:
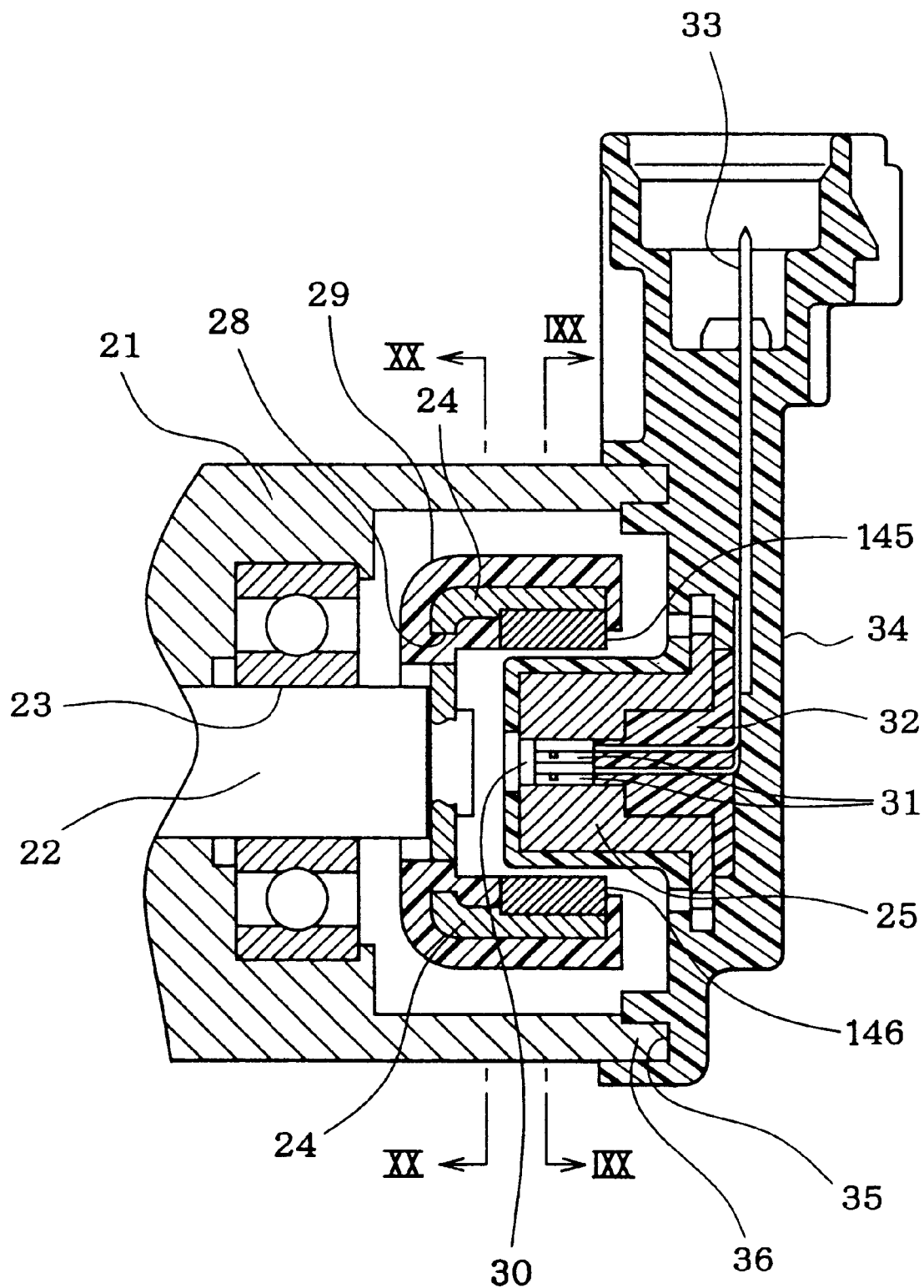
FIG. 18 is a vertical sectional view of an angular position detection apparatus illustrating a sixth embodiment of the present invention.

Next, a fifth embodiment of the present invention will be explained with reference to FIGS. 16, 17A and 17B. Here, portions, which are substantially the same portion as those of the fourth embodiment, are put the same symbols to omit explanations.

In the fifth embodiment, a rotation lever 137 for connecting with the detection target object is formed by molding the rotor core 24 and the permanent magnet 27 using resin. A molded resin portion, which is an inner side of the rotor core 24 and the permanent magnet 27, of the rotation lever 137 is inserted and rotatably supported to an outer side of a stator core 139. Here, the molded resin portion, which is an inner side of the rotor core 24 and the permanent magnet 27, acts as a bearing (slidably movable portion) with respect to the stator core 139. Therefore, the magnetic gap between the rotor core 24 and the periphery of the stator core 139 with respect to the permanent magnet 27 is secured by a thickness of the molded resin. The rotation lever 137 is pressed to a predetermined rotational direction by a twist coil spring 141, and is automatically returned to an initial position by a spring force.

A through hole 38 is formed in a center portion of the rotation lever 137. A small-diameter portion 40 provided at a left end portion of the stator core 139 is inserted to the through hole 38. A stopper plate 143, which is fixed to a tip portion of the small-diameter portion 40, prevents the rotation lever 137 from being removed from the stator core 139. A ring washer 142 for restricting a movement of the rotation lever toward a thrust direction is sandwiched between the stopper plate 143 and the rotation lever 137.

Furthermore, the magnetic flux detection gap portion 30, which passes through toward a diametral direction, is formed to a center portion of the stator core 139. As shown in FIG. 17A, a pair of Hall IC 31 is arranged in the magnetic flux detection gap portion 30, by stacking toward a direction of the magnetic flux going through the magnetic flux detection gap portion 30. As shown in FIG. 17B, the pair of the Hall IC 31 may be arranged along a direction perpendicular to a direction of the magnetic flux going through the magnetic flux detection gap portion 30. Here, a cylindrical cover portion 144 is integrally formed with the connector housing 34 so as to surround peripheries of the rotation lever 137 or the rotor core 24.

According to the fifth embodiment described in the above, the permanent magnet 27 is parallel magnetized as the same way as the fourth embodiment. As a result, it can expand the range, in which the magnetic flux density in the magnetic flux detection gap portion 30 linearly changes in proportion to the angular position of the rotor core 24, compared to the radial magnetization as the related art. Moreover, it can obtain the linear output with respect to the angular position in wider range compared to the related art, and it can improve the detection accuracy of the angular position.

Sixth Embodiment

Next, a sixth embodiment of the present invention will be explained with reference to FIGS. 18 through 24. Here, since the sixth embodiment has many common portions with the fourth embodiment, portions, which are substantially the same portion as those of the fourth embodiment, are put the same symbols to omit explanations.

In the fourth embodiment, only one permanent magnet 27 is provided at one side of the rotor core 24. On the contrary, in the sixth embodiment, as shown in FIGS. 18, 19A, 19B and 20, two permanent magnets 145 and 146, each of which has a circular arc, is provided at both sides of the rotor core 24 so as to confront with each other. As shown in FIG. 21C, the upper permanent magnet 145 is magnetized so that an outer side becomes S pole and an inner side becomes N pole; and the lower permanent magnet 146 is magnetized so that an outer side becomes N pole and an inner side becomes S pole. In a case where these permanent magnets 145 and 36 are mounted on the rotor core 24, when the stator core 25 is not provided at the inner side of the rotor core 24 as shown in FIG. 21B, lines of the magnetic force in the upper permanent magnet 145 are inclined to outer side, and lines of the magnetic force in the lower permanent magnet 146 are inclined to inner side. Furthermore, in a case where the stator core 25 is provided at the inner side of the rotor core 24, since the magnetic flux of the upper permanent magnet 145 goes through the lower permanent magnet 146 via the stator core 25 as shown in FIG. 21A, an inclination of the lines of the magnetic force in the permanent magnets 145 and 146 decrease to substantially parallel condition.

Figure 19A:
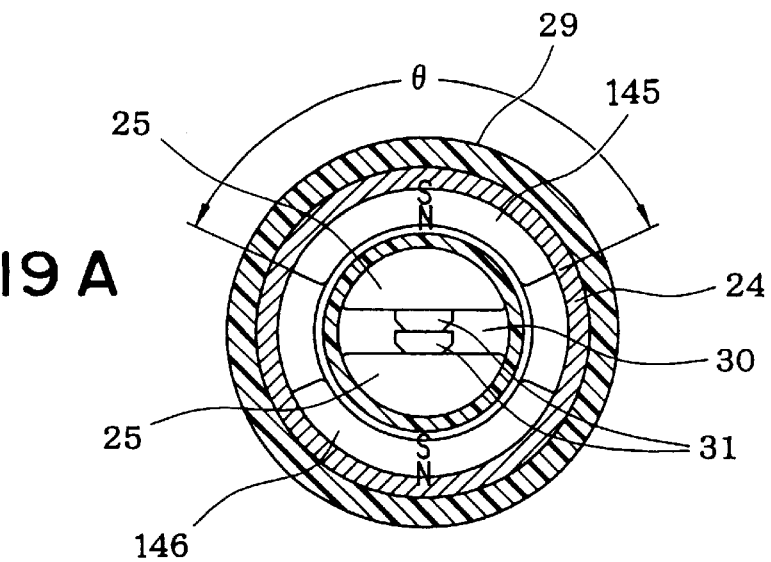
FIGS. 19A and 19B are plan views taken along a line IXX—IXX in FIG. 18, illustrating different arrangement of Hall IC, respectively.
Figure 19B:
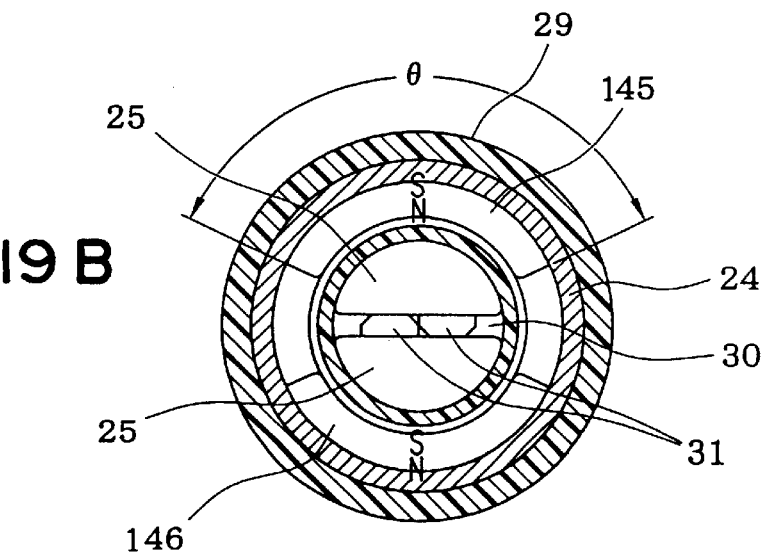
Figure 20:
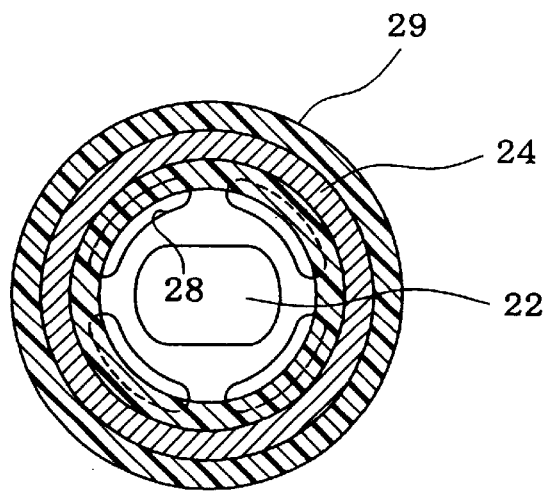
FIG. 20 is a sectional view taken along a line XX—XX in FIG. 18.

Similar to the fourth embodiment, the pair of Hall IC 31 is arranged in the magnet flux detection gap portion 30 so as to be stacked in the direction of the magnetic flux (see FIG. 29A), or is arranged along the direction perpendicular to the direction of the magnet flux detection gap portion 30 so as to be stacked in the direction of the magnetic flux (see FIG. 19B.).

Figure 24:
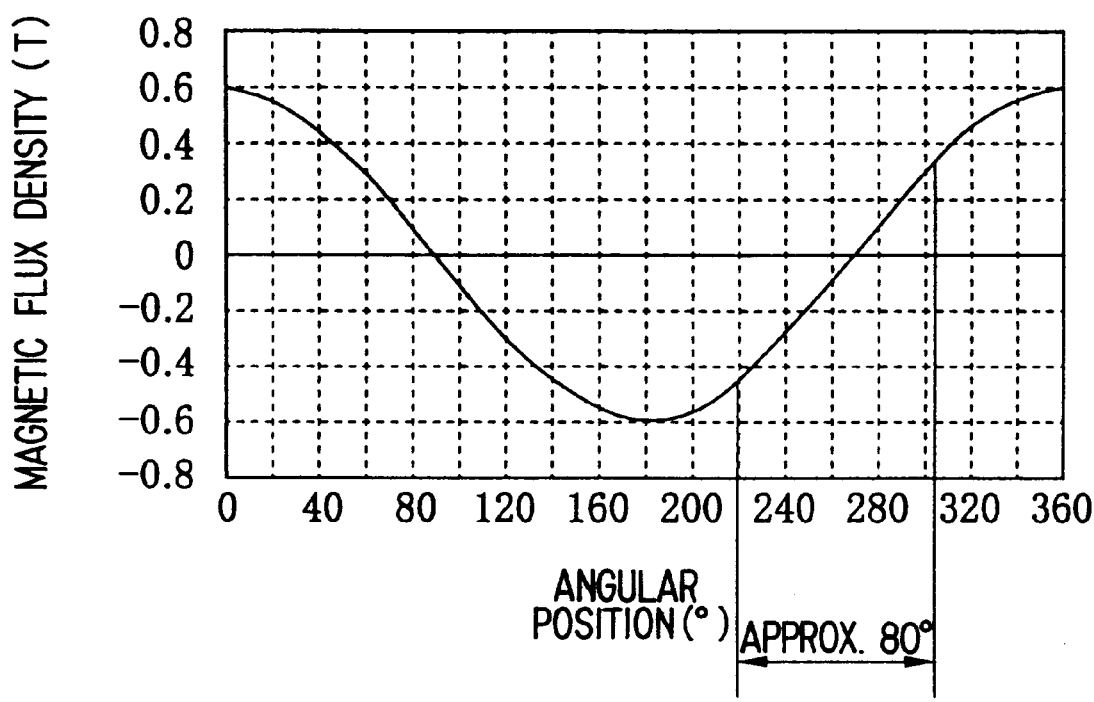
FIG. 24 is a graph illustrating the change characteristic of the magnetic flux density at the magnetic flux detection gap portion with respect to the angular position of the rotor core of the related art.

In the related art shown in FIGS. 22A–22C, a pair of permanent magnets 13 is radially magnetized. According to this related art, as shown in FIG. 24, a range, in which the magnetic flux in the magnetic flux detection gap portion 14 linearly changes in proportion to the angular position of the rotor core 11, is at most approximately 80° (degree). Therefore, when the angular position exceeds 80° (degree), it is impossible to obtain linear output with respect to the angular position can, and a detection accuracy of the angular position decreases.

Figure 23A:
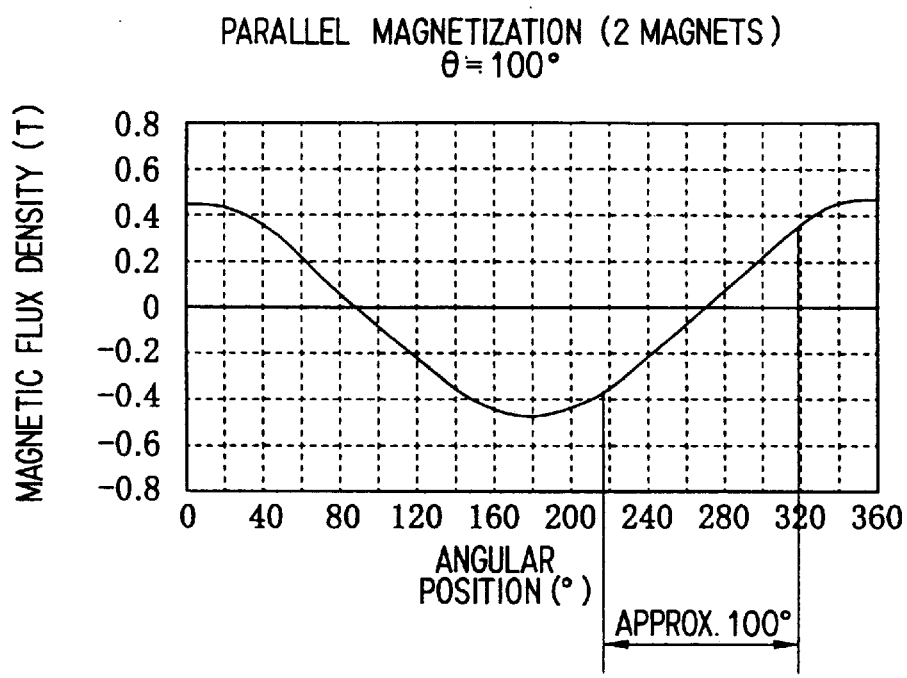
FIGS. 23A and 23B are graphs each of which illustrating a relationship between the change characteristic of the magnetic flux density at the magnetic flux detection gap portion with respect to the angular position of the rotor core and an angle of circumference θ of the permanent magnet of the sixth embodiment.

On the contrary, according to the fifth embodiment, the permanent magnets 145 and 146 are parallel magnetized, as shown in FIG. 23A, the range, in which the magnetic flux in the magnetic flux detection gap portion 30 linearly changes in proportion to the angular position of the rotor core 11, can be expanded to approximately 100° (degree) (when an angle of circumference θ of each permanent magnet 145, 146 shown in FIGS. 19A and 19B is approximately 100° (degree), it can obtain the linear output with respect to the angular position in wider range compared to the related art, and it can improve the detection accuracy of the angular position.

Figure 23B:
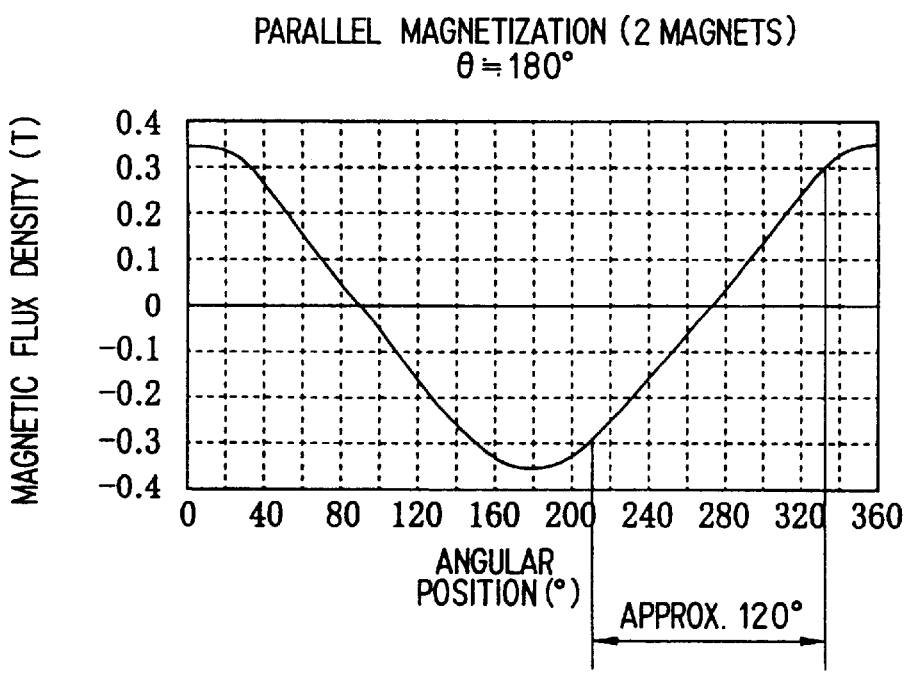

When the angle of circumference θ of each permanent magnet 145, 146 is set to approximately 180° (degree), the range, in which the magnetic flux in the magnetic flux detect-ion gap portion 14 linearly changes in proportion to the angular position, can be expanded to approximately 120° (degree) as shown in FIG. 23B, and can obtain the linear output with respect to the angular position in further wider range.

According to experimental results conducted by inventors, it is confirmed that the range, in which the magnetic flux in the magnetic flux detection gap portion 14 linearly changes in proportion to the angular position, can be expanded to more than 100° (degree)when the angle of circumference θ of each permanent magnet 145, 146 is set to more than 90° (degree).

Moreover, according to the sixth embodiment, since two permanent magnets 145 and 146 are arranged so as to sandwich the stator core 25, compared to the case where only one permanent magnet is provided at one side of the rotor core, the magnetic flux density going through the magnetic flux detection gap portion 30 in the stator core 25 can be increased, outputs from the Hall element can be increased, and detection accuracy of the angular position can be improved. Furthermore, when the magnetic flux to be detected increases, it can reduce an amplification factor of the output signal from the magnetic detection element, and can simplifies a structure of a signal amplifying circuit. As a result, it can reduce a cost of the Hall IC 31. Furthermore, it can secure a desired magnetic flux density even if a thickness of the individual permanent magnet 145, 146 is thinned. Therefore, it can reduce an outer size in the rotor core 24 and therefore an outer size of the angular position detection apparatus due to a thinning of the permanent magnet 145, 146.

Seventh Embodiment

Figure 25:
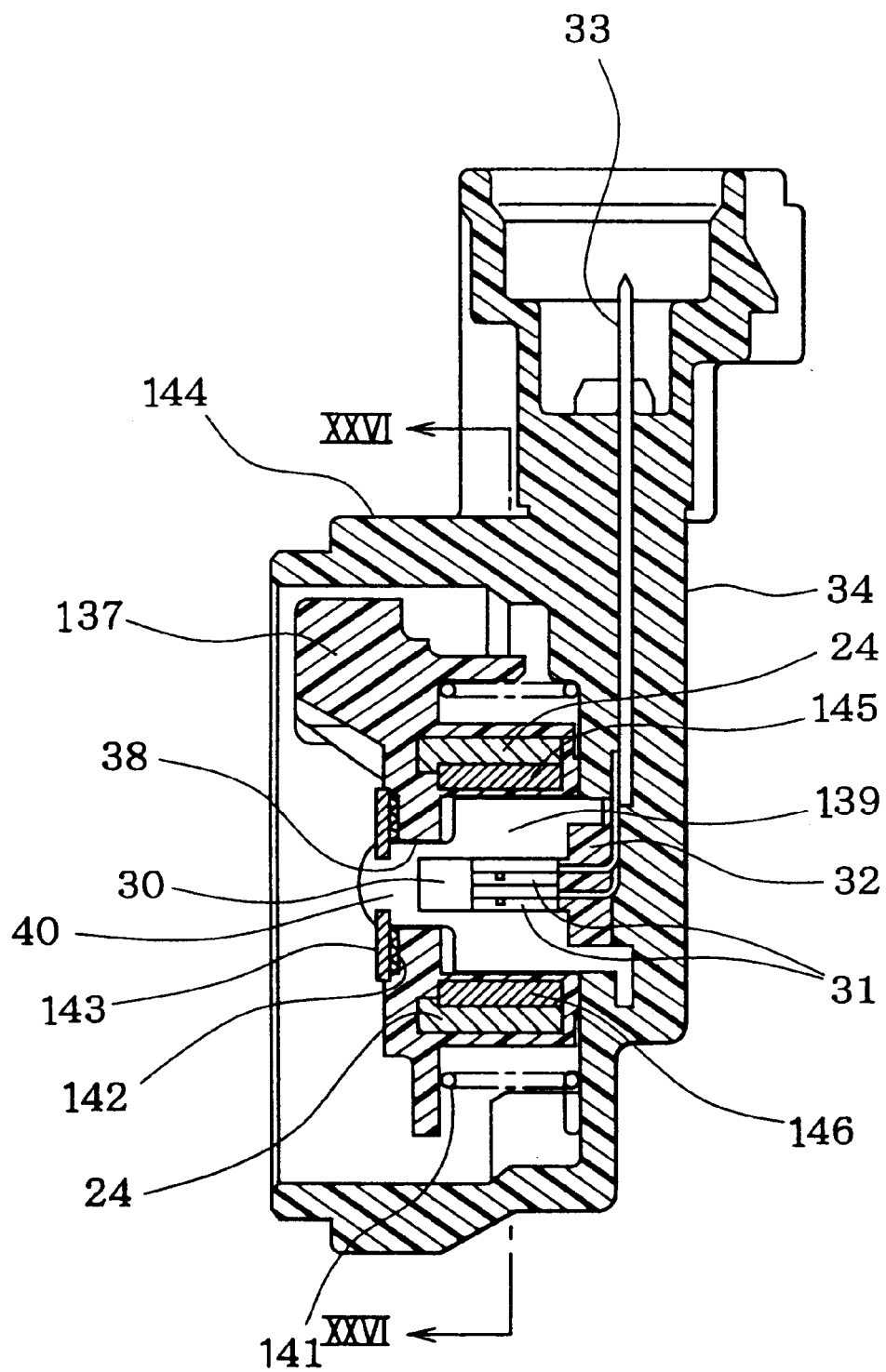
FIG. 25 is a vertical sectional view of an angular position detection apparatus illustrating a seventh embodiment of the present invention.
Figure 26A:
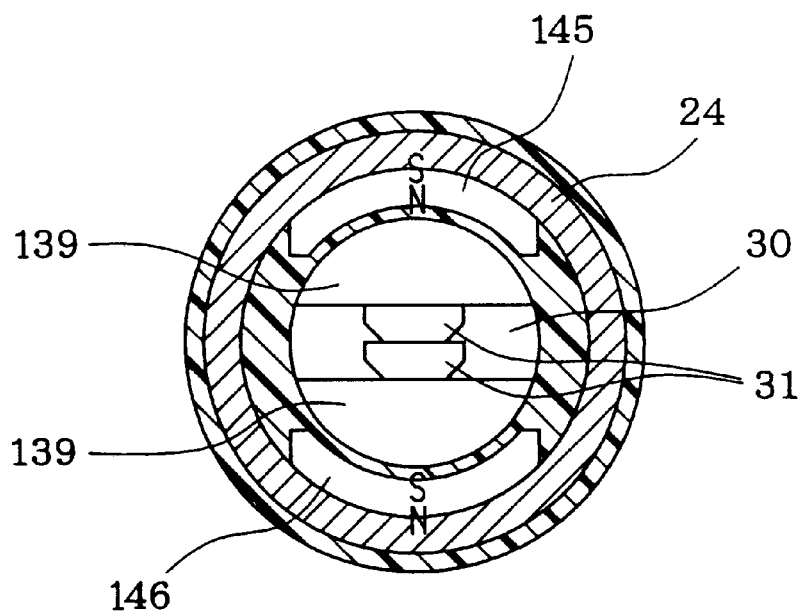
FIGS. 26A and 26B are plan views taken along a line XXVI—XXVI in FIG. 25, illustrating different arrangement of Hall IC, respectively.
Figure 26B:
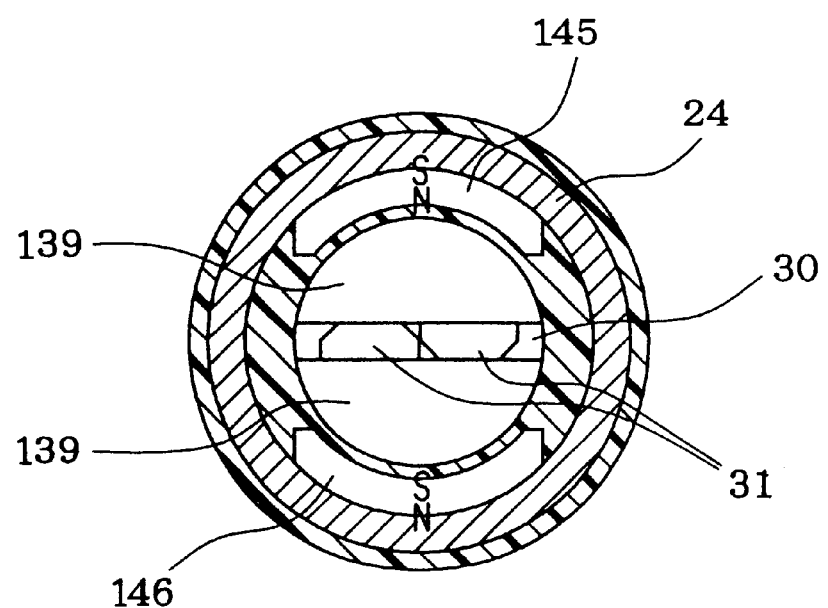

Next, a seventh embodiment of the present invention will be explained with reference to FIGS. 25 and 26. Here, since the seventh embodiment has many common portions with the fifth embodiment, portions, which are substantially the same portion as those of the fifth embodiment, are put the same symbols to omit explanations.

In the fifth embodiment, only one permanent magnet 27 is provided at one side of the rotor core 24. On the contrary, in the seventh embodiment, two permanent magnets 145 and 146, each of which is parallel magnetized, is provided at both sides of the rotor core 24 so as to confront with each other with respect to the stator core 139. Other structures are the same as those of the fifth embodiment.

The seventh embodiment can also obtain the same effects as that of the sixth embodiment in which two permanent magnets 145 and 146, each of which is parallel magnetized, is arranged.

In each embodiment described in the above, the number of the Hall IC 31 to be arranged at the magnetic flux detection gap portion 30 is 2; however, it may be only one. Furthermore, when the magnetic flux detection gap portion 30 has enough space, three or more Hall IC 31 may be arranged in the magnetic flux direction or the perpendicular thereof. Moreover, as the magnetic detection element for detecting the magnetic flux density of the magnetic flux detection gap portion 30, a magnetic resistance element or the like may be used instead of the Hall IC (Hall element).

The present invention is not limited to the angular position detection apparatus for throttle valve; but is applicable to angular position detection apparatuses for several types of rotators.

What is claimed is:

1. An angular position detection apparatus comprising:
   a rotor core mounted for rotating in response to rotation of a detection target object;
   a permanent magnet fixed to the rotor core;
   a stator core concentrically arranged with respect to the rotor core; and
   a magnetic detection element disposed at a magnetic flux detection gap formed in the stator core for outputting a signal in response to magnetic flux going through the magnetic flux detection gap,
   wherein angular position of the detection target object is detected based on an output from the magnetic detection element,
   the permanent magnet being fixed to a side portion of the rotor core and a cylindrical portion thereof for closely confronting an outer surface of the stator core at a radial gap in which magnetic flux goes through an air gap between an inner surface of the cylindrical portion and an outer surface of the stator core, and
   the permanent magnet is magnetized so that lines of magnetic force in the permanent magnet are parallel with respect to each other.

2. An angular position detection apparatus as in claim 1, wherein:
   the permanent magnet is formed in a ring shape, and
   the permanent magnet is concentrically fixed to the side surface of the rotor core.

3. An angular position detection apparatus as in claim 1, wherein:
   the air gap between the inner surface of the cylindrical portion and the outer surface of the stator core is smaller than a gap between the permanent magnet and the stator core.

4. An angular position detection apparatus as in claim 1, wherein the permanent magnet is magnetized so that substantially all the lines of magnetic force are set to parallel each other.

5. An angular position detection apparatus as in claim 1 wherein a closed magnetic circuit is formed by said rotor core, said permanent magnet and said stator core.

6. An angular position detection apparatus as in claim 5 wherein magnetic lines of force in the permanent magnet and in the stator core are parallel to each other.

7. An angular position detection apparatus which is applicable to a system in which a rotation of an actuator is transmitted to a rotation body via a reduction mechanism,
   said apparatus detecting angular position of the rotation body by detecting magnet flux of a permanent magnet integrally rotatable with the rotation body using a magnetic detection element fixed to a predetermined position,
   wherein the permanent magnet is fixed to a rotational shaft of the rotation body, and the magnetic detection element is fixed at an inner side of a cover which covers the reduction mechanism.

8. An angular position detection apparatus as in claim 7, wherein:
   the permanent magnet and the stator core confront each other in an axial direction of the rotor core.

9. An angular position detection apparatus as in claim 8, further comprising:
   a rotor core on which the permanent magnet is fixed, for rotating in response to a rotation of the rotation body; and
   a stator core concentrically arranged with respect to the rotor core,
   wherein the permanent magnet is fixed to a side portion of the rotor core, and a cylindrical portion closely confronting an outer surface of the stator core is formed at an outer surface of the rotor core, so as to form a radial gap in which magnetic flux goes through an air gap disposed between an inner surface of the cylindrical portion and an outer surface of the stator core in a radial direction.

10. An angular position detection apparatus as in claim 7, wherein at least a gear, which is fixed to the rotational shaft of the rotation body, among gears constituting the reduction mechanism, is made of resin, and the permanent magnet is inserted to the gear.

11. An angular position detection apparatus as in claim 10, wherein the permanent magnet and the stator core confront each other in an axial direction of the rotor core.

12. An angular position detection apparatus as in claim 11 further comprising:
   a rotor core on which the permanent magnet is fixed to rotate in response to rotation of the rotation body; and
   a stator core concentrically arranged with respect to the rotor core,
   wherein the permanent magnet is fixed to a side portion of the rotor core, and a cylindrical portion closely confronting an outer surface of the stator core is formed at an outer surface of the rotor core, so as to form a radial gap in which magnetic flux goes through an air gap between an inner surface of the cylindrical portion and an outer surface of the stator core in a radial direction.

13. An angular position detection apparatus as in claim 7 wherein a closed magnetic circuit is formed by a rotor core, a permanent magnet and a stator core.

14. An angular position detector as in claim 13 wherein magnetic lines of force in the permanent magnet and in the stator core are parallel to each other.

15. An angular position detection apparatus comprising:
   a rotor core mounted for rotating in response to rotation of a detection target object;
   a permanent magnet fixed to the rotor core;
   a stator core concentrically arranged with respect to the rotor core; and
   a magnetic detection element arranged at a magnetic flux detection gap formed in the stator core and outputting a signal in response to magnetic flux going through the magnetic flux detection gap, wherein an angular position of the detection target object is detected based on an output from the magnetic detection element, the permanent magnet being fixed to a side portion of the rotor core, and a cylindrical portion closely confronting an outer surface of the stator core is formed at an outer surface of the rotor core, so as to form a radial gap in which magnetic flux goes through an air gap between an inner surface of the cylindrical portion and an outer surface of the stator core in a radial direction, and the permanent magnet is magnetized parallel to a detection direction of the magnetic detection element.

16. An angular position detection apparatus as in claim 15 wherein the permanent magnet is magnetized so that substantially all the lines of magnetic force are set to parallel each other.

17. An angular position detection apparatus as in claim 16 wherein magnetic lines of force in the permanent magnet and in the stator core are parallel to each other.

18. An angular position detection apparatus comprising:

a rotor core having a ring shape mounted for rotating in response to rotation of a detection target object;

a stator core concentrically arranged with respect to the rotor core at an inside portion of the rotor core;

at least one permanent magnets provided in the rotor core so as to confront an outer surface of the stator core; and at least one magnetic detection elements arranged at a magnetic flux detection gap formed in the stator core, said elements outputting a signal in response to magnetic flux going through the magnetic flux detection gap, wherein angular position of the detection target object is detected based on an output from the magnetic detection element, and the permanent magnet is magnetized so that lines of magnetic force in the permanent magnet are parallel with respect to each other.

19. An angular position detection apparatus as in claim 18, wherein:

the permanent magnet is arranged in a depression portion formed in an inner portion of the rotor core, so that an air gap between the permanent magnet and the stator core is uniformly formed with respect to an air gap between the rotor core and the stator core.

20. An angular position detection apparatus as in claim 18, wherein:

the number of the permanent magnets is two, and the two permanent magnets are arranged to confront each other with respect to the stator core.

21. An angular position detection apparatus as in claim 18, wherein:

plural magnetic detection elements are provided, and the plural magnetic detection elements are arranged along or perpendicular to a direction of magnetic flux going through the magnetic flux detection gap.

22. An angular detection apparatus as in claim 18 wherein the permanent magnet is magnetized so that substantially all the lines of magnetic force are set to parallel each other.

23. An angular detection apparatus as in claim 22 wherein magnetic lines of force in the permanent magnet and in the stator core are parallel to each other.

* * * * *